US011934881B2

(12) United States Patent
Tsuji et al.

(10) Patent No.: US 11,934,881 B2
(45) Date of Patent: Mar. 19, 2024

(54) SERVICE PROGRAM DEVICE ALLOCATION AND RELEASE

(71) Applicant: Nippon Telegraph and Telephone Corporation, Tokyo (JP)

(72) Inventors: Masahiko Tsuji, Tokyo (JP); Shinichiro Eitoku, Tokyo (JP); Yukihisa Katayama, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 824 days.

(21) Appl. No.: 16/981,000

(22) PCT Filed: Mar. 7, 2019

(86) PCT No.: PCT/JP2019/009145
§ 371 (c)(1),
(2) Date: Sep. 15, 2020

(87) PCT Pub. No.: WO2019/176740
PCT Pub. Date: Sep. 19, 2019

(65) Prior Publication Data
US 2021/0109794 A1 Apr. 15, 2021

(30) Foreign Application Priority Data
Mar. 15, 2018 (JP) .................. 2018-047897

(51) Int. Cl.
*G06F 9/50* (2006.01)
(52) U.S. Cl.
CPC .............. *G06F 9/5027* (2013.01); *G06F 9/50* (2013.01)

(58) Field of Classification Search
CPC .................................. G06F 9/5027; G06F 9/50
See application file for complete search history.

(56) References Cited

U.S. PATENT DOCUMENTS 8,234,650 B1 * 7/2012 Eppstein ............. H04L 67/1025
718/100
8,527,973 B2 * 9/2013 Little ....................... G06F 8/456
717/149
(Continued)

FOREIGN PATENT DOCUMENTS

JP 2017-97494 6/2017

*Primary Examiner* — Benjamin C Wu
(74) *Attorney, Agent, or Firm* — Fish & Richardson P.C.

(57) ABSTRACT

Allowing an execution of an allocation processing and allocation release the processing of a device to a service program during an execution of the service program. Under control of an execution management section (1112), in case device transmission data received is device transmission data satisfying a predetermined transition condition of a state transition, a service state of the service program is updated. Then, under control of an execution management section (1112), a notification of the service state update is transmitted to a service context determination section (113). Under control of the service context determination section (113), whether there is a change in a service context to be executed on the service program based on service context information is confirmed. When it is confirmed that the service context is changed, under control of the service context determination section (113), a device occupation request or a device occupation release request is transmitted to a device management section (114).

12 Claims, 22 Drawing Sheets

(56) References Cited

U.S. PATENT DOCUMENTS

| | | | |
|---|---|---|---|
| 9,268,604 B1* | 2/2016 | Herzberg | G06Q 10/20 |
| 9,628,402 B2* | 4/2017 | Alabiso | H04L 41/5051 |
| 2008/0222620 A1* | 9/2008 | Little | G06F 8/45 |
| | | | 717/149 |
| 2012/0131591 A1* | 5/2012 | Moorthi | G06F 9/5061 |
| | | | 718/104 |
| 2013/0117758 A1* | 5/2013 | Cuadra | G06F 9/5022 |
| | | | 718/104 |
| 2015/0067171 A1* | 3/2015 | Yum | H04L 67/562 |
| | | | 709/226 |

* cited by examiner

| CLASSIFICATION OF DEVICE TRANSMISSION/RECEPTION | DEVICE IDENTIFIER | DEVICE INTERFACE IDENTIFIER | CONTEXT COEFFICIENT |
|---|---|---|---|
| RECEPTION | Dev001 | ControlA | 1.0 |
| RECEPTION | Dev002 | ControlB | 0.2 |
| TRANSMISSION | Dev003 | NotifyA | 1.0 |
| TRANSMISSION | Dev004 | NotifyB | 0.2 |
| | | | |

Fig. 5

| SERVICE CONTEXT IDENTIFIER | STATE LIST | IN-USE DEVICE LIST |
|---|---|---|
| SC0001 | ST001/ST002/ST003 | Dev001/Dev002 |
| SC0002 | ST004/ST005/ST006 | Dev001/Dev003 |
| | | |

Fig. 6

| SERVICE PROGRAM IDENTIFIER | SERVICE CONTEXT IDENTIFIER | IN-USE DEVICE LIST | OCCUPATION STATE | START (SCHEDULED) TIME |
|---|---|---|---|---|
| SP0001 | SC0001 | Dev001/Dev002 | IN OCCUPATION | 2017/11/29 10:00:00 |
| SP0002 | SC0002 | Dev001/Dev003 | RESERVED FOR OCCUPATION | 2017/11/29 10:00:45 |
| | | | | |

Fig. 7

| SERVICE PROGRAM IDENTIFIER | SERVICE CONTEXT IDENTIFIER | STATE | STATE START TIME | POSSESSION TIME |
|---|---|---|---|---|
| SP0001 | SC0001 | ST001 | 2017/11/29 10:00:00 | 15s |
| SP0002 | SC0002 | ST002 | 2017/11/29 10:00:10 | 20s |
|  |  |  |  |  |

Fig. 8A

| SERVICE PROGRAM IDENTIFIER | SERVICE CONTEXT IDENTIFIER BEFORE TRANSITION | STATE BEFORE TRANSITION | SERVICE CONTEXT IDENTIFIER AFTER TRANSITION | STATE AFTER TRANSITION | TRANSITION START TIME |
|---|---|---|---|---|---|
| SP0001 | SC0001 | ST001 | SC0001 | ST002 | 2017/11/29 10:00:00 |
| SP0002 | SC0002 | ST002 | SC0003 | ST003 | 2017/11/29 10:00:10 |
| | | | | | |

Fig. 8B

| | PATTERN 1 | PATTERN 2 | PATTERN 3 | PATTERN 4 | PATTERN 5 | PATTERN 6 | PATTERN 7 | PATTERN 8 |
|---|---|---|---|---|---|---|---|---|
| IMAGE DIAGRAM | STATE ○↑○ STATE TRANSITION | ○↑○ | ○↑○ | ○↑○ | ○↑○ | ○↑○ | ○↑○ | ○↑○ |
| CONTEXT COEFFICIENT OF STATE TRANSITION | THRESHOLD VALUE OR MORE | THRESHOLD VALUE OR MORE | THRESHOLD VALUE OR MORE | THRESHOLD VALUE OR MORE | THRESHOLD VALUE OR LESS | THRESHOLD VALUE OR LESS | THRESHOLD VALUE OR LESS | THRESHOLD VALUE OR LESS |
| CONTEXT COEFFICIENT OF TRANSITION SOURCE STATE | THRESHOLD VALUE OR MORE | THRESHOLD VALUE OR MORE | THRESHOLD VALUE OR LESS | THRESHOLD VALUE OR LESS | THRESHOLD VALUE OR MORE | THRESHOLD VALUE OR MORE | THRESHOLD VALUE OR LESS | THRESHOLD VALUE OR LESS |
| CONTEXT COEFFICIENT OF TRANSITION DESTINATION STATE | THRESHOLD VALUE OR MORE | THRESHOLD VALUE OR LESS | THRESHOLD VALUE OR MORE | THRESHOLD VALUE OR LESS | THRESHOLD VALUE OR MORE | THRESHOLD VALUE OR LESS | THRESHOLD VALUE OR MORE | THRESHOLD VALUE OR LESS |

Fig. 10

SERVICE PROGRAM DEVICE ALLOCATION AND RELEASE

CROSS-REFERENCE TO RELATED APPLICATIONS

This application is a National Stage application under 35 U.S.C. § 371 of International Application No. PCT/JP2019/009145, having an International Filing Date of Mar. 7, 2019, which claims priority to Japanese Application Serial No. 2018-047897, filed on Mar. 15, 2018. The disclosure of the prior application is considered part of the disclosure of this application, and is incorporated in its entirety into this application.

TECHNICAL FIELD

The present disclosure relates to a method, a system, and a program for controlling an allocation of a device, on which a service program is executed, to the service program.

BACKGROUND ART

In recent years, a technology for creating a service program using a state transition model involving a state and a state transition has been known. In such a service program, a device for an execution of the service program is registered in association with the subject service program, and executing the service program provides the service by controlling a device group (for example, see Patent Literature 1).

CITATION LIST

Patent Literature

Patent Literature 1: JP 2017-97494 A

SUMMARY OF THE INVENTION

Technical Problem

However, in such a technology described in Patent Literature 1, a device used in an always-on service cannot be shared by a plurality of services, as such a device is always allocated to the service program related to the service and thus occupied.

The present disclosure has been made in view of the above circumstances, and an object of the present disclosure is to provide a method, a system, and a program allowing an execution of an allocation processing and allocation release the processing of a device to a service program during the execution of the service program.

Means for Solving the Problem

To solve the above problem, a first aspect of the present disclosure provides a device allocation control method, executed by an apparatus including a hardware processor and a memory, for allocating a device on a service providing field to a service program stored in a storage section, the device allocation control method including: a service context determination step of determining, during an execution of the service program by the apparatus, whether to start or end a predetermined service context as a processing unit of the service program based on data communicated between the device allocated to the service program and the apparatus; and during the execution of the service program by the apparatus, a device occupation control step including at least one of the steps of: allocating, in case the predetermined service context is determined to start, a device to be used for executing the predetermined service context determined to start to the service program, or releasing, in case the predetermined service context is determined to end, an allocation of the device to be used for executing the predetermined service context determined to end to the service program.

According to a second aspect of the present disclosure, the device allocation control method further includes: extracting a data communication event kept by each of a predefined state and state transition included in the service program; and determining a service context as a processing unit of the service program based on the data communication event kept by each of the predefined state and state transition, and a context coefficient corresponding to a score value representing a likelihood of occurrence, set for each data communication event, of another data communication event subsequent to said communication event.

According to a third aspect of the present disclosure, the device allocation control method further includes: revising the context coefficient based on a history of a data communication event occurred between the device allocated to the service program and the apparatus.

According to a fourth aspect of the present disclosure, in the device allocation control method, the device occupation control step further includes, in case the predetermined service context is determined to start, and the device to be used for executing the predetermined service context is allocated to a second service program, notifying a time at which the device becomes available to be allocated to the service program.

According to a fifth aspect of the present disclosure, in the device allocation control method, the device occupation control step includes, in case the predetermined service context is determined to start and the device to be used for executing the predetermined service context is allocated to the second service program, calculating a time at which the device becomes available to be allocated to the service program based on a history of a maintenance time of each state included in the second service program during an execution of the second service program, and a history of a state transition indicating a state preceding and subsequent to a transition of the state transition in the second service program during the execution of the second service program.

Effects of the Invention

According to the first aspect of the present disclosure, during the execution of the service program, an allocation of a device to the service program is controlled based on a service context that is a processing unit of the service program. For this reason, even during the execution of the service program, which is when the device is required to execute that service program, there is a device that is not allocated to that service program. Thus, even in a case of the interruption by another service program, such a device can be allocated to the service program without interrupting the service program being executed, and the device can be shared by a plurality of services. On the other hand, control is performed such that the required device is allocated to the service program in the unit of service context so that the device can be prevented from being used by another service while the service program requires the device.

According to the second aspect of the present disclosure, a service context that is a processing unit of the service program is determined based on a criterion for the context coefficient. Hence, a control of device allocation to a service program is executed with an optimum granularity of the service context determined based on the context coefficient.

According to the third aspect of the present disclosure, the context coefficient is revised based on real data of a data communication event accompanying an execution of the above service program. For this reason, for example, since it is possible to reflect the communication status at each time the above service program is executed, the service context determined based on the context coefficient will have a more realistic granularity.

According to the fourth aspect of the present disclosure, when a device to be used for executing a service context cannot be used, a time at which the device becomes available to be allocated to the service context is notified. For example, such a notification facilitates the time management of a device shared among a plurality of services.

According to the fifth aspect of the present disclosure, based on a past history when a second service program is executed, a time at which a device being allocated to that second service program becomes available to be allocated to another service program is calculated. Such predicted times calculated based on the real past data are highly reliable.

That is, according to each aspect of the present disclosure, it is possible to provide a method, a system, and a program allowing an execution of an allocation processing and an allocation release the processing of a device to a service program during the execution of the service program.

BRIEF DESCRIPTION OF DRAWINGS

FIG. 5 is a diagram illustrating an example of context coefficient information.

FIG. 6 is a diagram illustrating an example of service context information.

FIG. 7 is a diagram illustrating an example of device occupation information.

FIG. 8A is a diagram illustrating an example of state maintenance time log information.

FIG. 8B is a diagram illustrating an example of state transition log information.

FIG. 10 is a diagram schematically illustrating the processing of determining a state transition in which a transition source state and a transition destination state are included in the same service context.

DESCRIPTION OF EMBODIMENTS

Hereinafter, an embodiment according to the present disclosure will be described with reference to the drawings.

Note that in the present embodiment, a status in which a device is allocated to a service program is also expressed by an expression that the device is occupied by the service program.

First Embodiment

Figure 1:
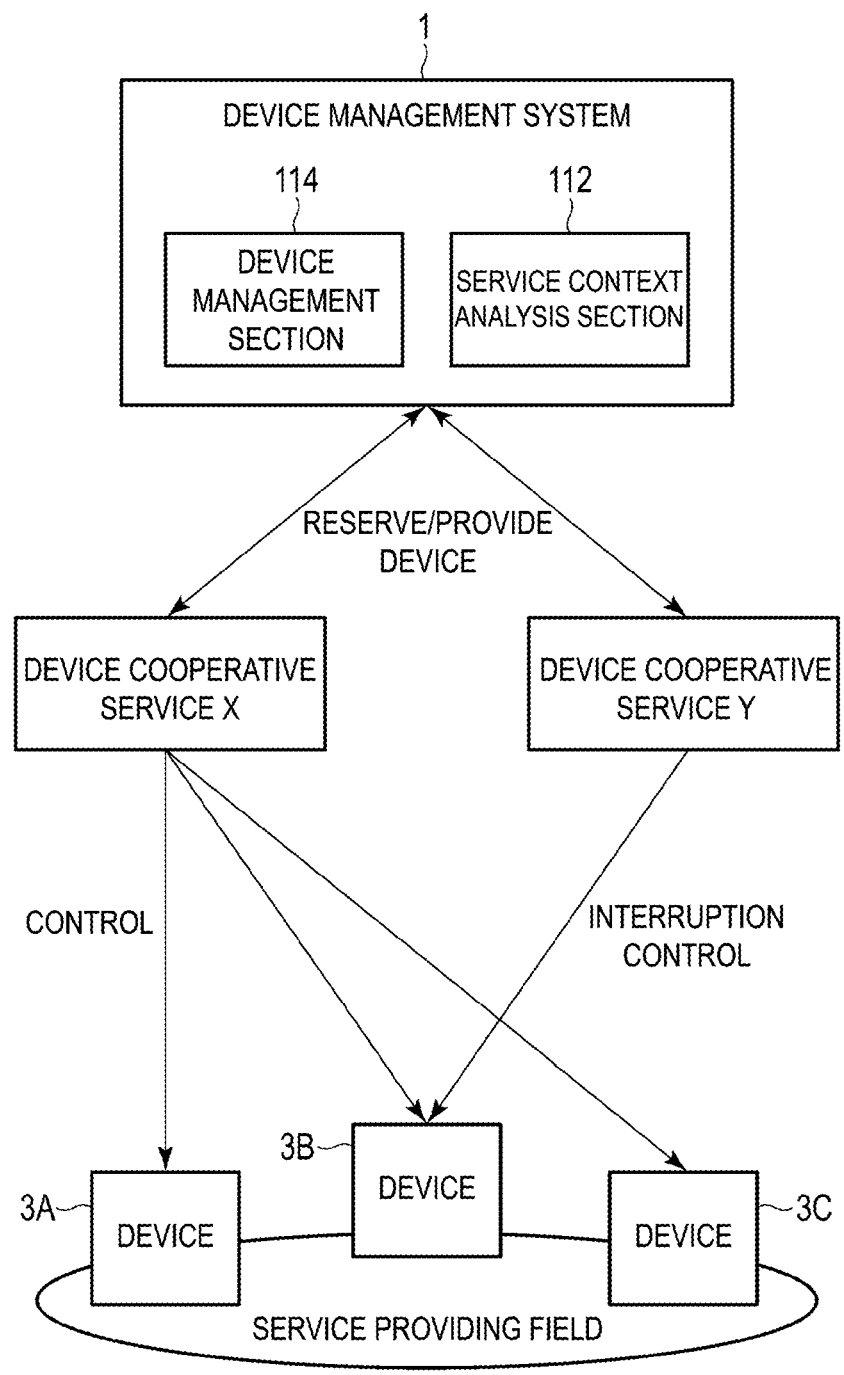
FIG. 1 is a bird's-eye view of the first embodiment of the present disclosure.

FIG. 1 is a bird's-eye view of a first embodiment of the present disclosure.

A device management system 1 according to the first embodiment of the disclosure may provide a plurality of device cooperative services that can be provided by controlling the devices on a service providing field. In the device management system 1, a device controlled by a service program of a certain device cooperative service can be interruption controlled by a service program of another device cooperative service during the execution of the service program.

FIG. 1 illustrates that a device 3B controlled by a service program of a device cooperative service X is interruption-controlled by a service program of a device cooperative service Y while the device cooperative service X is being provided.

Here, a service context that is a processing unit of a service program is defined to enable such control.

Figure 2:
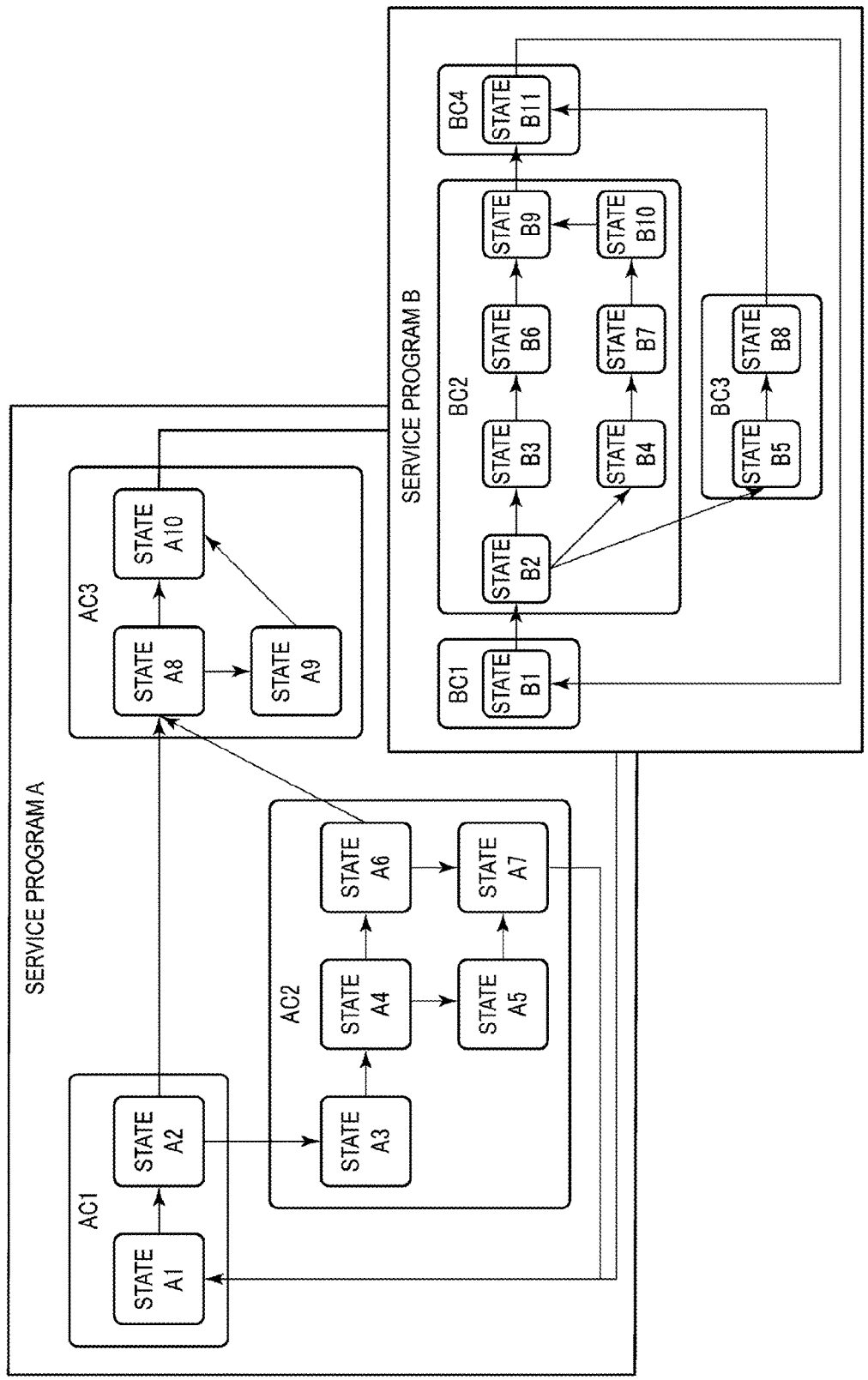
FIG. 2 is a diagram illustrating an example of a service context configuration of a service program according to the first embodiment of the present disclosure.

FIG. 2 is a diagram illustrating an example of a service context configuration of a service program according to the first embodiment of the present disclosure.

First, the service program handled in the first embodiment of the present disclosure is constituted by "state" and "state transition".

A state is a certain state of a service defined by the service program, and includes one or more of receiving data transmitted from a device (hereinafter referred to as device transmission data), processing the device transmission data, and transmitting a control command to the device (hereinafter, referred to as a device control command).

A state transition is a condition for transitioning from one state to another, and is configured with a conditional expression. Further, a part of a state transition condition is configured with a result of receiving device transmission data, for example, "when the data transmitted from the temperature sensor is 28° C. or higher", then the state transits to the next state.

In an example illustrated in FIG. 2, in a service program A, as a processing unit of the above-described service program, a service context AC1 constituted by a state A1 and a state A2, a service context AC2 constituted by a state A3, a state A4, a state A5, a state A6, and a state A7, and a service context AC3 constituted by a state A8, a state A9, and a state A10 are defined.

Further, in a service program B, as a processing unit of the above-described service program, a service context BC1 constituted by a state B1, a service context BC2 constituted by a state B2, a state B3, a state B4, a state B6, a state B7, a state B9, and a state B10, a service context BC3 constituted by a state B5 and a state B8, and a service context BC4 constituted by a state B11 are defined.

For example, when the service context AC1 is executed, only the device used for the processing of the state A1 and the state A2 is occupied by the service program A. When the processing of the service context AC1 is completed, the device occupied by the service program A during the execution of the service context AC1 is released.

As described above, a device group is occupied or released in service context units during the execution of the service program, and therefore, even during the execution of the service program, an unoccupied device can be interruption-controlled by another service program.

Figure 3:
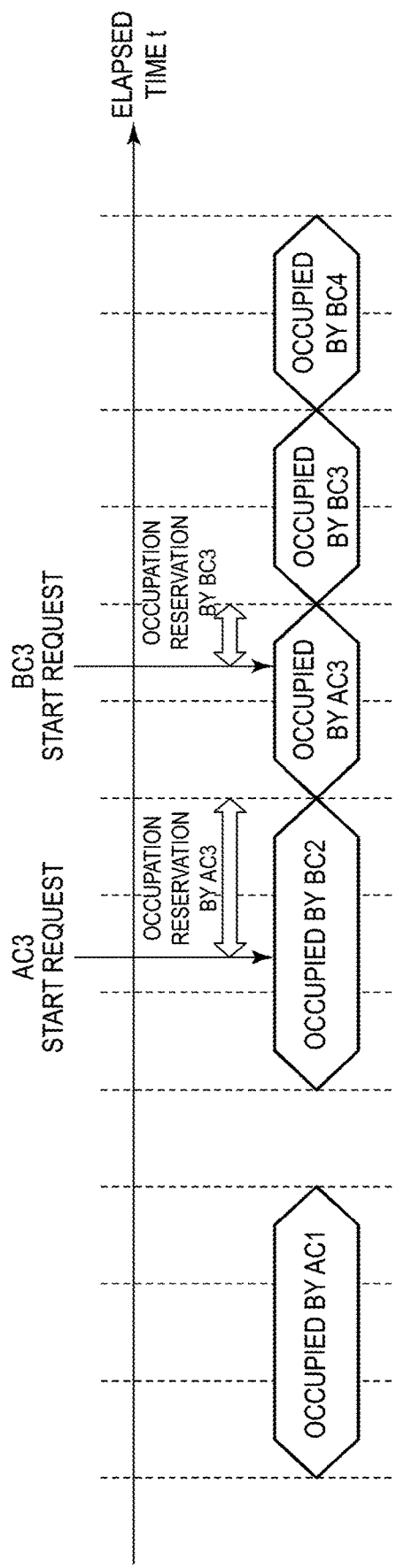
FIG. 3 is a diagram illustrating an example of a device occupation status and an elapsed time relating to the service program illustrated in FIG. 2.

FIG. 3 is a diagram illustrating an example of an occupation status and elapsed time of a certain device relating to the service programs A and B illustrated in FIG. 2.

Initially, the service context AC1 of the service program A uses the device so that the device is occupied by the service context AC1. When the service context AC1 is completed, the occupation of the device is released. After that, the device is occupied by the service context BC2 of the service program B. After that, there is an occupation reservation from the service context AC3 before the service context BC2 is completed, thereby the device is resource-reserved by the service context AC3 after the service context BC2 is completed. After that, there is an occupation reservation from the service context BC3 before the service context AC3 is completed, thereby the device is reserved so that the service context BC3 can exclusively use the device after the service context AC3 is completed without changing the occupation state of the device.

Configuration

Figure 4:
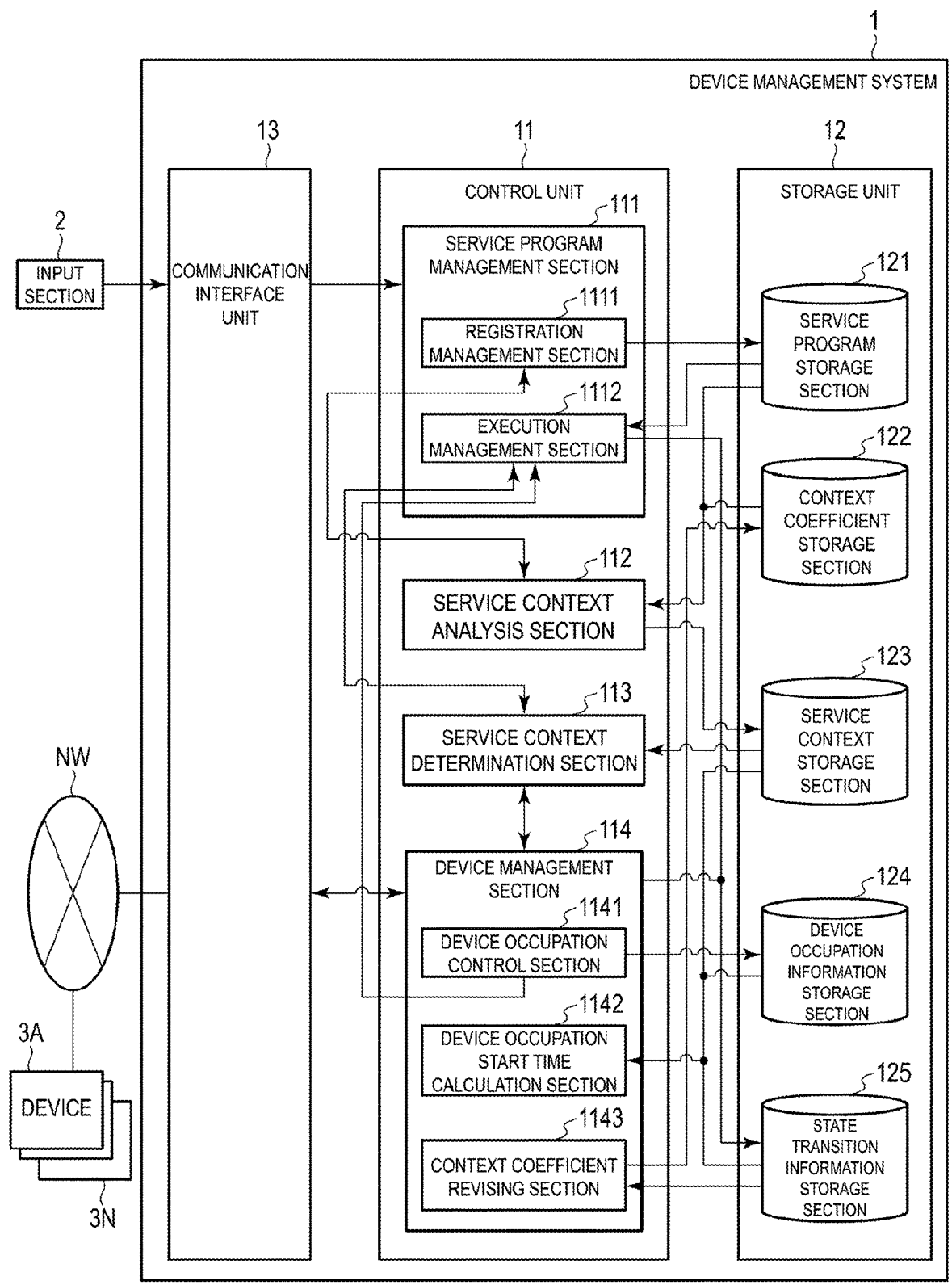
FIG. 4 is a block diagram illustrating a functional configuration of a device management system according to the first embodiment of the present disclosure.

FIG. 4 is a block diagram illustrating a functional configuration of the device management system 1 according to the first embodiment of the present disclosure. In the present embodiment, a device management system 1 will be described as a non-limiting example of a device allocation control system. Note that the device management system 1 illustrated in FIG. 4 is merely an example, and the components included in the device management system 1 may exist as physically separate apparatuses in any combination.

The device management system 1 includes a control unit 11, a storage unit 12, and a communication interface unit 13 as hardware.

The communication interface unit 13 includes, for example, one or more wired or wireless communication interface units. The communication interface unit 13 inputs, to the control unit 11, a service program input by an input section 2 including a keyboard or a mouse, for example, and an operation signal of the service program. Note that the service program is, for example, a program in which a service processing logic for receiving device transmission data or transmitting a device control command such as "when a first device transmits first data, causes a second device to perform first processing" via a device interface, is described.

Further, the communication interface unit 13 outputs device transmission data transmitted from devices 3A, . . . , 3N, which are terminals such as robots and sensors, to the control unit 11, and outputs data such as a device control command output from the control unit 11 to the devices 3A, . . . , 3N.

The storage unit 12 uses, as a storage medium, a non-volatile memory that can be written and read at any time, such as a Hard Disc Drive (HDD) or a Solid State Drive (SSD). To realize the present embodiment, the storage unit 12 includes a service program storage section 121, a context coefficient storage section 122, a service context storage section 123, a device occupation information storage section 124, and a state transition information storage section 125.

The service program storage section 121 is used to store a service program to be registered.

The context coefficient storage section 122 stores context coefficient information. The context coefficient information includes, for example, a context coefficient corresponding to a score value, which is set for each event of receiving transmission data of each device and transmitting control commands of each device and represents ease of occurrence of another data communication event after the event.

The service context storage section 123 is used to store the service context information. The service context information includes, for example, service context information for each service program determined under the control of a service context analysis section 112.

The device occupation information storage section 124 is used to store device occupation information. The device occupation information includes, for example, information about a device group occupied by each service program being executed or a device group having occupation reservations.

The state transition information storage section 125 is used to store state transition information. The state transition information includes, for example, state maintenance time log information including a log of time required from the start to the end of a state, and state transition log information including a state before the transition to a certain state, a state after the transition from the service context and the state, and a log of the service context, which are related to a state transition.

The control unit 11 includes a hardware processor such as a Central Processing Unit (CPU) and a program memory. To execute a processing function in the present embodiment, the control unit 11 includes a service program management section 111, a service context analysis section 112, a service context determination section 113, and a device management section 114. All of these processing functions of each of these units are realized by causing the hardware processor to execute a program stored in the program memory. Note that these processing functions may be realized not by using a program stored in the program memory, but by using a program provided through a network.

The service program management section 111 includes a registration management section 1111 and an execution management section 1112.

The registration management section 1111 executes processing for registering a service program. Specifically, first, the registration management section 1111 executes the processing of acquiring a service program from the input section 2 via the communication interface unit 13 and storing the acquired service program in the service program storage section 121. After that, the registration management section 1111 executes the processing of requesting the service context analysis section 112 to analyze the service program.

The execution management section 1112 executes the processing of reading and executing the service program stored in the service program storage section 121, transmitting a device control command to the service context determination section 113, and receiving device transmission data from the service context determination section 113. Further, as the service program is being executed, the execution management section 1112 executes the processing of storing in the state transition information storage section 125 a history of the maintenance time length of a state relating to the service program as state maintenance time log information and a history of a state transition relating to the service program as state transition log information.

The service context analysis section 112 executes the processing of reading the service program stored in the service program storage section 121 in response to the request from the registration management section 1111, referring to the context coefficient information stored in the context coefficient storage section 122, and analyzing the read service program to determine the service context. Next, the service context analysis section 112 executes the processing of storing the information about the determined service context in the service context storage section 123.

The service context determination section 113 executes the processing of receiving a device control command from the execution management section 1112 of the service program management section 111, and transmitting the received device control command to the device management section 114. Further, the service context determination section 113 executes the processing of receiving the device transmission data from the device management section 114 and transmitting the received device transmission data to the execution management section 1112 of the service program management section 111.

Here, the service context determination section 113 determines a state of the service program being executed based on the device control command received from the execution management section 1112 of the service program management section 111 or the device transmission data received from the device management section 114, and the service context information stored in the service context storage section 123. Thus, the service context determination section 113 can execute the processing of determining the start and end of the service context.

For example, the service context determination section 113 may execute the processing of determining that the received device control command or device transmission data corresponds to a predetermined device control command or device transmission data included in the last state of a certain service context, and determining that the service context ends. Further, the service context determination section 113 may execute the processing of determining that the received device transmission data satisfies a transition condition of a certain state transition, and determining that ending the service context including the state before the transition of the state transition or starting the service context including the state after the transition of the state transition.

When the service context is determined to end, the service context determination section 113 executes the processing of transmitting, to the device management section 114, a request for releasing the occupation of the device group occupied by the service program to execute the service context (hereinafter referred to as a device occupation release request). Further, based on the determination of the state of the above service program during execution, the service context determination section 113 may execute the processing of transmitting a device occupation release request for releasing the occupation of the occupied device group to the device management section 114, provided that there is a device group that is not to be used in the service context thereafter.

Further, when the service context is determined to start, the service context determination section 113 executes the processing of transmitting, to the device management section 114, a request for the service program to occupy a device group necessary for executing the service context (hereinafter referred to as a device occupation request).

The device management section 114 executes the processing of receiving the device control command from the service context determination section 113, and transmitting the received device control command to a real device of the destination among the devices 3A to 3N via the communication interface unit 13. Further, the device management section 114 executes the processing of acquiring the device transmission data transmitted from the devices 3A to 3N via the communication interface unit 13 and transmitting the acquired data to the service context determination section 113.

The device management section 114 includes a device occupation control section 1141, a device occupation start time calculation section 1142, and a context coefficient revising section 1143.

The device occupation control section 1141 executes the processing of receiving the device occupation request and the device occupation release request transmitted from the service context determination section 113, and performing the occupation or release occupation of the device group specified in the received device occupation request and device occupation release request. After that, the device occupation control section 1141 executes the processing of storing information of the occupation or release occupation of the device group in the device occupation information storage section 124.

Note that when the device group specified in the device occupation request cannot be occupied due to occupation by another service program, the device occupation control section 1141 executes the processing of performing occupation reservation of the device group, and storing the information about the occupation reservation of the device group in the device occupation information storage section 124. When the device group, for which occupation was reserved, is released, the device occupation control section 1141 executes the processing of occupation on the reserved device group.

The device occupation start time calculation section 1142 executes the processing of reading the device occupation information stored in the device occupation information storage section 124 when, as described above, the occupation reservation of the device group was made. After that, the device occupation start time calculation section 1142 executes the processing of calculating a time at which the device group is to be released from occupation by another service program and becomes available as the device occupation start time based on the read device occupation information The context coefficient revising section 1143 executes the processing of reading the state transition information stored in the state transition information storage section 125, reading and revising the context coefficient stored in the context coefficient storage section 122 based on the read state transition information, and storing the revised context coefficient in the context coefficient storage section 122.

FIG. 5, FIG. 6, FIG. 7, FIG. 8A, and FIG. 8B illustrate a data structure of information used in the present embodiment.

FIG. 5 illustrates an example of the context coefficient information stored in the context coefficient storage section 122. It is assumed that the context coefficient information is registered in advance when, for example, an operator registers a service program.

FIG. 6 illustrates an example of the service context information stored in the service context storage section 123.

FIG. 7 illustrates an example of the device occupation information stored in the device occupation information storage section 124.

FIG. 8A illustrates an example of the state maintenance time log information stored in the state transition information storage section 125.

FIG. 8B illustrates an example of the state transition log information stored in the state transition information storage section 125.

Operation

Next, the operation of the device management system 1 configured as described above will be described.

First, the service context determination processing, the context coefficient revision processing, and the device occupation start time calculation processing executed by the control unit 11 of the device management system 1 illustrated in FIG. 4 will be described.

Service Context Determination Processing

A set of a service context identifier, a state list, an in-use device list, and context coefficients for each state and state transition to be stored in the service context storage section 123 may be explicitly entered when the service program is registered. Alternatively, the service context analysis section 112 may automatically determine those as follows.

Figure 9:
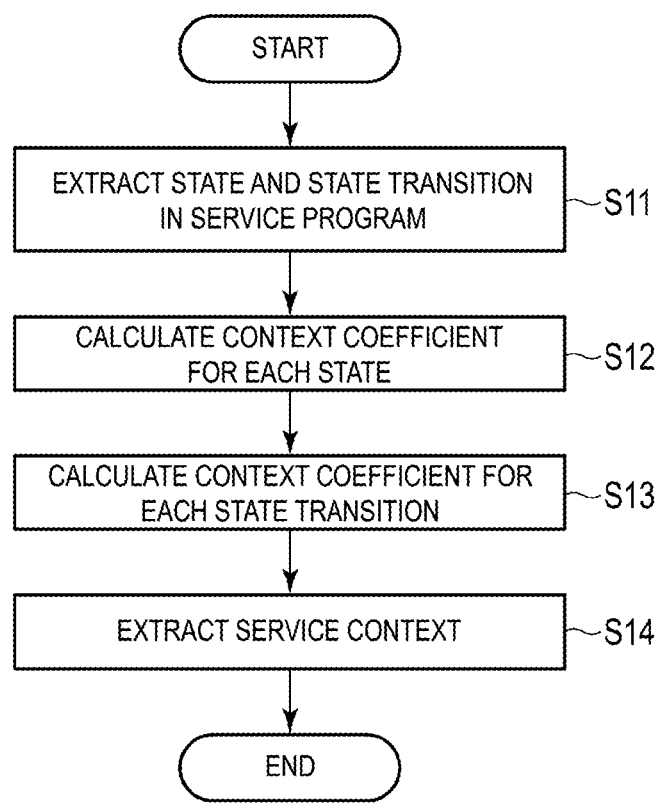
FIG. 9 is a flowchart illustrating an example of service context determination processing executed by a control unit illustrated in FIG. 4.

FIG. 9 is a flowchart illustrating an example of a service context determination processing executed by a control unit 11 illustrated in FIG. 4. The service context determination processing is executed under the control of the service context analysis section 112.

First, in step S11, under the control of the service context analysis section 112, the control unit 11 reads a service program stored in the service program storage section 121, and extracts and lists the predefined state and state transition included in the read service program.

Each state and state transition is constituted by one or a plurality of combinations of "transmission of device control command" or "reception of device transmission data" that can be uniquely identified by "classification of device transmission/reception", "device identifier", and "device interface identifier".

In step S12, under the control of the service context analysis section 112, the control unit 11 extracts, for each state extracted in step S11, events of transmission of a device control command and reception of device transmission data included in the state. Next, under the control of the service context analysis section 112, the control unit 11 reads the context coefficient of the events of the transmission of the extracted device control command and the reception of the device transmission data stored in the context coefficient storage section 122. After that, under the control of the service context analysis section 112, for each of the above extracted states, the control unit 11 calculates a value obtained by dividing a sum of the context coefficients of the events of transmission of the device control command and reception of the device transmission data included in the state by the total number of events of transmission of the device control command and reception of the device transmission data as a context coefficient of the state.

In step S13, under the control of the service context analysis section 112, the control unit 11 reads, for each state transition extracted in step S11, a context coefficient of an event of transmission of the device control command or reception of device transmission data included in the state transition, which is stored in the context coefficient storage section 122. After that, under the control of the service context analysis section 112, for each of the above extracted state transitions, the control unit 11 calculates a value obtained by dividing a sum of the context coefficients of the events of transmission of the device control command and reception of the device transmission data included in the state transition by the total number of events of transmission of the device control command and reception of the device transmission data as a context coefficient of the state transition.

Note that the processing in step S12 and step S13 may be executed in the reverse order of the above, or may be executed in parallel.

In step S14, under the control of the service context analysis section 112, the control unit 11 uses the context coefficient of each state calculated in step S12 and the context coefficient of each state transition derived in step S13, and then determines and extracts a service context relating to the service program.

An example of the service context determination processing in step S14 will be described below.

First, in step S14-1, a state transition in which a transition source state and a transition destination state are included in the same service context is determined. Specifically, the following state transition is determined as a state transition in which the transition source state and the transition destination state are included in the same service context.

1) A state transition in which the context coefficient is equal to or greater than a threshold value $t_c$ 2) A state transition in which the context coefficient is less than the threshold value $t_c$, but the context coefficient of the transition source state and the context coefficient of the transition destination state are both equal to or greater than the threshold value $t_t$ Further, the state transition of 3) and 4) below may be included as a state transition in which the transition source state and the transition destination state are included in the same service context.

3) A state transition having a state transition corresponding to 1) or 2) in the N (N is a natural number equal to or greater than 1) pieces of state transitions.

4) For each state transition up to N-number of (N is a natural number equal to or greater than 1) state transitions, a state transition in which a context coefficient of the transition source state, which is obtained by weighting and adding the context coefficient of each transition source state, a context coefficient of the state transition, which is obtained by weighting and adding the context coefficient of each state transition, and a context coefficient of the transition destination state, which is obtained by weighting and adding the context coefficient of each transition destination state, correspond to 1) or 2).

Next, in step S14-2, a service context is extracted. Specifically, in step S14-1, the service context is extracted such that the state of the transition source and the state after the transition of the state transition, which is not determined as "a state transition in which the transition source state and the transition destination state are included in the same service context", are different service contexts.

FIG. 10 is a diagram schematically illustrating the processing of determining a state transition in which the transition source state and the transition destination state are included in the same service context in step S14-1.

Patterns 1 to 4 are state transitions corresponding to 1) above. Pattern 5 is a state transition corresponding to 2) above. Patterns 6 to 8 are state transitions that do not correspond to 1) and 2) above.

Context Coefficient Revision Processing

The context coefficient revision processing executed under the control of the context coefficient revising section 1143 of the device management section 114 will be described in detail. In the context coefficient revision processing, addition or subtraction of a context coefficient is performed in the following cases using a log (time of state transition, device reservation, reception time of a control command, and the like) at the time when a service program is executed. It is possible to re-extract the service context based on the context coefficient revised in this way.

(1) Addition Processing

Figure 11:
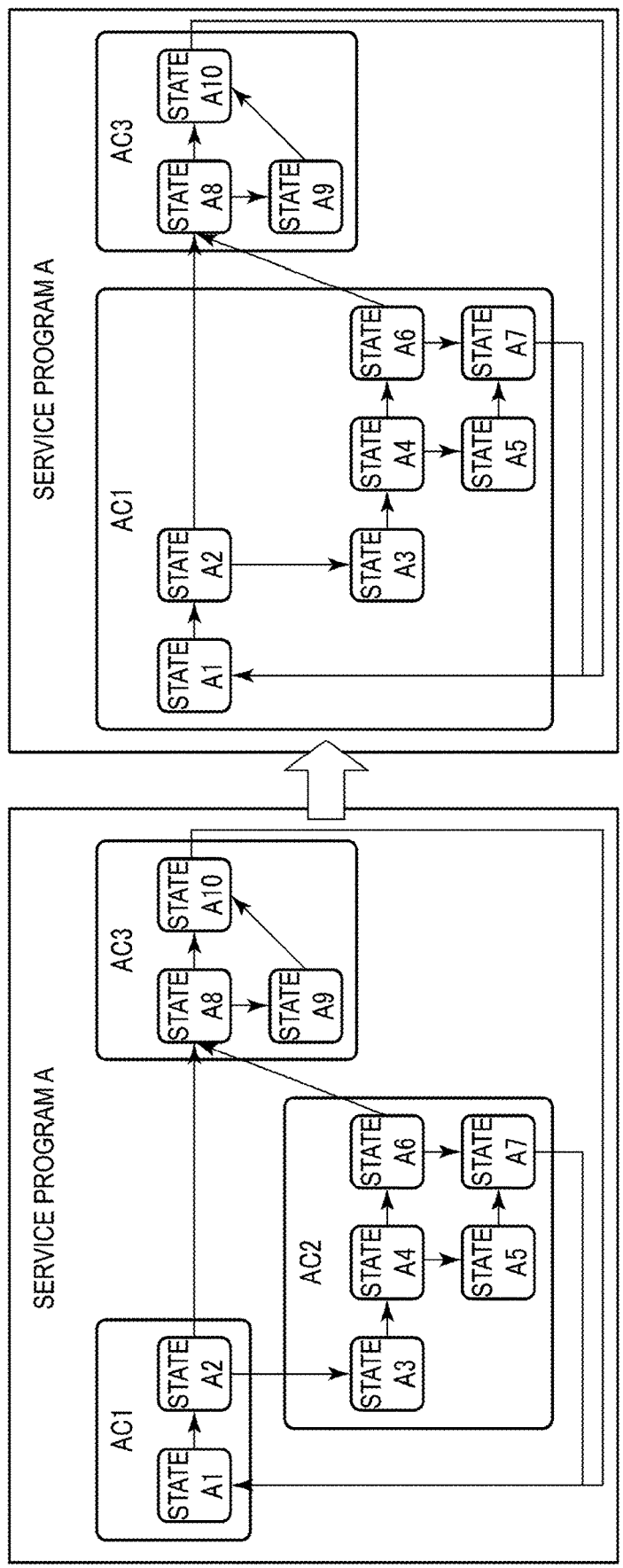
FIG. 11 is a first image diagram of a service context configuration of a service program relating to the revision processing of a context coefficient.

FIG. 11 is a first image diagram of the service context configuration of the service program relating to the revision processing of a context coefficient.

In the service program A, the state A3 often starts immediately after the state A2 ends. In this case, as illustrated in FIG. 11, in order to include the state A2 and the state A3 in one service context, the context coefficient of the state A2, the context coefficient of the state A3, or the context coefficient of the state transition from the state A2 to the state A3 is set to be large. Therefore two divided service contexts can be easily combined into one.

In such context coefficient revision processing, the evaluation of the length of time from the end of a certain service context "a" in the service program to the reception of a start request command for the next service context "b" is performed. When the length of time is short, the last state of the service context "a" and the first state of the service context "b", and the context coefficient of the state transition between the two states are increased.

Figure 12:
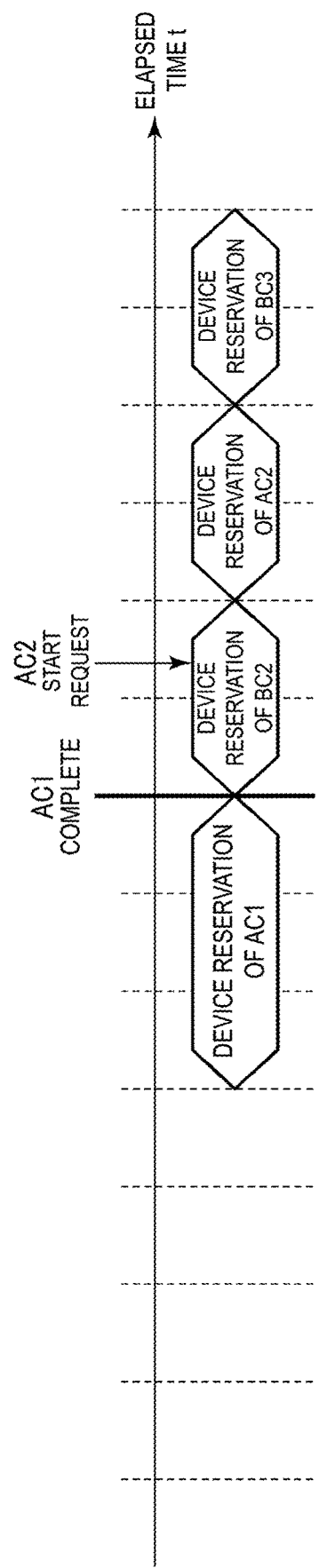
FIG. 12 is a diagram illustrating an example of a device occupation reservation and elapsed time relating to the service program illustrated in FIG. 11.

FIG. 12 is a diagram illustrating an example of device occupation reservation and elapsed time relating to the service program A illustrated in FIG. 11.

In the example of the context coefficient revision processing relating to the state A2 and the state A3 as described above, as illustrated in FIG. 12, the context coefficient revision processing is executed using the completion time of the service context AC1 and the history of the time at which the device transmission data that satisfies the transition condition for transitioning to the next service context AC2 after the completion of the service context AC1 is received.

In the context coefficient revision processing, when the transition from the service context AC_{i} to the service context AC_{j} occurs for the specified number of times dc_{all}, context coefficient addition processing is performed using an evaluation value at the time of context coefficient addition that satisfies, $$MC = a\frac{dc_s}{dc_{all}} \; \left(\text{if } a\frac{dc_s}{dc_{all}} \geq t_{MC}\right), \; 0 \; (\text{else}) \qquad \text{[Equation 1]}$$

The parameters are as follows, a: constant, $dc_s$: the number of times of transmission of a device control command or reception of device transmission data received for the first time within a threshold value b seconds after the previous service context is completed among $dc\_\{all\}$, $dc_{all}$: the number of times transition from service context $AC\_\{i\}$ to service context $AC\_\{j\}$ occurred, $t_{MC}$: a threshold value for determining whether to add the context coefficient.

The addition of the context coefficient is performed according to the following equation.

$$c_{st\_AC\_\{i\}} = c_{st\_AC\_\{i\}} + MC \; (\text{if } c_{st\_AC\_\{i\}} + MC \leq C_{MAX}),$$
$$c_{MAX} \; (\text{else})$$

$$c_{tr\_AC\_\{i\}} = c_{tr\_AC\_\{i\}} + MC \; (\text{if } c_{tr\_AC\_\{i\}} + MC \leq C_{MAX}),$$
$$c_{MAX} \; (\text{else})$$

$$c_{st\_AC\_\{j\}} = c_{st\_AC\_\{j\}} + MC \; (\text{if } c_{st\_AC\_\{j\}} + MC \leq C_{MAX}),$$
$$c_{MAX} \; (\text{else}) \qquad \text{[Equation 2]}$$

The parameters are as follows, $C\_\{st\_AC\_\{i\}\}$: a context coefficient of an event of transmission of a device control command or reception of device transmission data included in the last state of a service context $AC\_\{i\}$, $C\_\{tr\_AC\_\{i\}\}$: a context coefficient of an event of transmission of a device control command or reception of device transmission data included in a state transition from a service context $AC\_\{i\}$ to a service context $AC\_\{j\}$, $C\_\{st\_AC\_\{j\}\}$: a context coefficient of transmission of a device control command or reception of device transmission data included in the first state of a service context $AC\_\{j\} C_{MAX}$: a maximum value of context coefficient.

(2) Subtraction Processing

Figure 13:
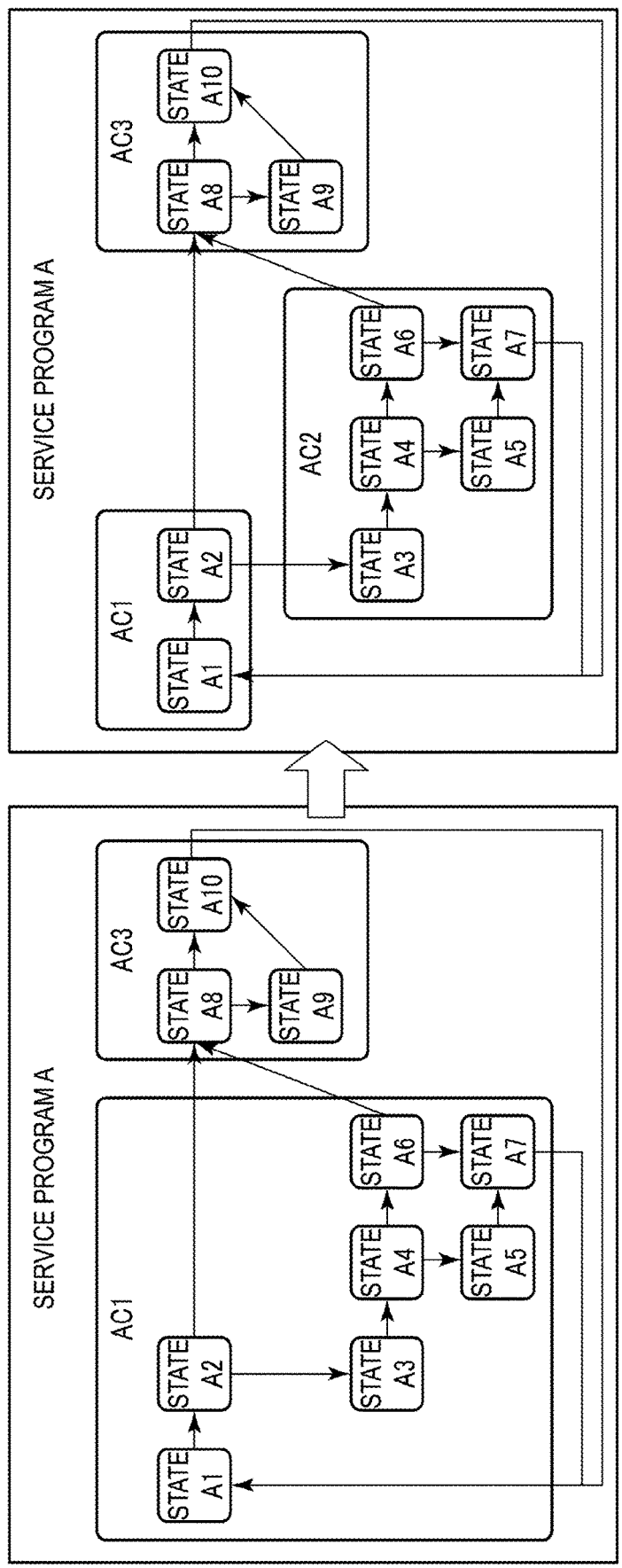
FIG. 13 is a second image diagram of the service context configuration of the service program relating to the revision processing of a context coefficient.

FIG. 13 is a second image diagram of the service context configuration of the service program relating to the revision processing of a context coefficient.

In the service program A, a transition from the state A2 to the state A3 normally takes time. In this case, as illustrated in FIG. 13, in order to include the state A2 and the state A3 in a different service context, the context coefficient of the state A2, the context coefficient of the state A3, or the context coefficient of the state transition from the state A2 to the state A3 is set to be small. This allows one service context to be easily divided, and device sharing by another service can be easily performed.

In such context coefficient revision processing, after starting a certain service context, the evaluation of the length of time required for each state transition in the service context is performed. When the length of time is long, the context coefficients of the state transition, the state before the transition, and the transition destination state are set to be small.

Figure 14:
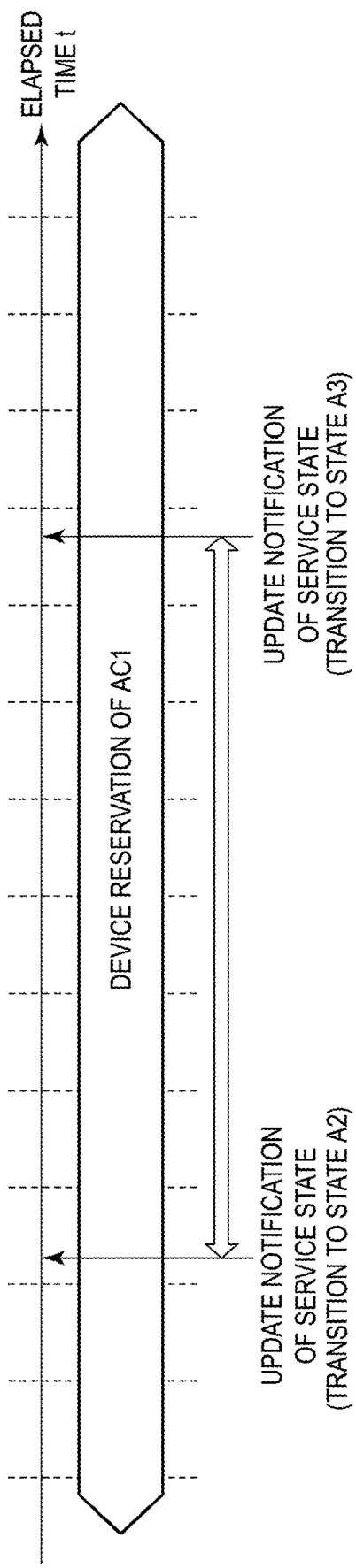
FIG. 14 is a diagram illustrating an example of device occupation reservation and elapsed time relating to the service program illustrated in FIG. 13.

FIG. 14 is a diagram illustrating an example of device occupation reservation and elapsed time relating to the service program A illustrated in FIG. 13.

In the example of the context coefficient revision processing relating to the states A2 and A3 as described above, as illustrated in FIG. 14, the context coefficient revision processing is executed using the time required for transitioning from the state A2 to the state A3, which is a history of the time required for the state transition in a certain service context. Note that an update notification of the service state illustrated in FIG. 14 is a notification indicating that "the state is changed" when the device transmission data generated in the execution management section 1112 of the service program management section 111 satisfies a certain transition condition and a state transition occurs.

In the context coefficient revision processing, when the transition within a certain service context occurs for the specified number of times st_{all}, context coefficient subtraction processing is performed using an evaluation value at the time of context coefficient subtraction that satisfies, $$DC = c\frac{st_s}{st_{all}} \left(\text{if } c\frac{st_s}{st_{all}} \le t_{DC}\right), 0 \text{ (else)} \quad \text{[Equation 3]}$$

The parameters are as follows, c: constant, $st_s$: among st_{all}, the number of times of transmission of a device control command or reception of device transmission data received for the first time after a threshold value of d seconds or more has elapsed since the previous service context is completed, $st_{all}$: the number of times transition from state {i} to state {j} occurred, $t_{DC}$: a threshold value for determining whether to subtract the context coefficient.

The subtraction of the context coefficient is performed according to the following equation.

$$c_{st\_\{i\}} = c_{st\_\{i\}} + DC \text{ (if } c_{st\_\{i\}} + DC \ge C_{MIN}\text{), } c_{MIN} \text{ (else)}$$

$$c_{tr\_\{i\}} = c_{tr\_\{i\}} + DC \text{ (if } c_{tr\_\{i\}} + DC \ge C_{MIN}\text{), } c_{MIN} \text{ (else)}$$

$$c_{st\_\{j\}} = c_{st\_\{j\}} + DC \text{ (if } c_{st\_\{j\}} + DC \ge C_{MIN}\text{), } c_{MIN} \text{ (else)} \quad \text{[Equation 4]}$$

The parameters are as follows, C_{st_{i}}: a context coefficient of an event of transmission of a device control command or reception of device transmission data included in a state {i} with respect to a state transition in a service context, C_{tr_{i}}: a context coefficient of an event of transmission of each device control command or reception of device transmission data included in a state transition from state {i} to state {j}, C_{st_{j}}: a context coefficient of an event of transmission of a device control command or reception of device transmission data included in a state {j}, $C_{MIN}$: a minimum value of context coefficient.

Device Occupation Start Time Calculation Processing

The device occupation start time calculation processing executed under the control of the device occupation start time calculation section 1142 of the device management section 114 will be described in detail.

The device management section 114 receives device occupation requests from a plurality of service programs. When a device occupation request from a certain service program is received and the device is already occupied by another service program, the device management section 114 permits or denies the device occupation request based on a priority set in each service program and the reception time of the device occupation request.

When the device occupation request is denied, the device management section 114 makes an occupation reservation based on the priority set in each service program or the reception time of the device occupation request, and records that fact in the device occupation information storage section 124. Furthermore, the device occupation start time calculation section 1142 of the device management section 114 may calculate time at which device occupation can be performed collectively based on the information about the service context, and respond.

In the device occupation start time calculation processing, it is assumed that the next log information is stored in the state transition information storage section 125.

1) State Maintenance Time Log Information

For each state constituting the service context, a log of the time required from the start to the end of the state is stored in the state transition information storage section 125.

2) State Transition Log Information

For each state constituting the service context, the state transition information storage section 125 stores logs of a state and service context before the transition to the state and logs of a state and a service context log after the transition from the state.

1) First, in the first step, an occupation status and an occupation reservation status of a device requested by a device occupation request are extracted. Specifically, the following is extracted from the data stored in the device occupation information storage section 124 for each device included in a device list required in a specified service context of a service program that requested device occupation (hereinafter, it is referred to as a request device list).

A service context occupying the device (hereinafter, it is referred to as a request device occupation service context).

Another service context performing an occupation reservation of the device (hereinafter, it is referred to as a request device prior engagement service context)

2) In the next step, the required execution time of the request device occupation service context and the request device prior engagement service context extracted in the above step are calculated based on the data stored in the state transition information storage section 125.

a) The execution start state and end state of the service context are acquired. When a calculation target is the "request device occupation service context", a state of being executed is acquired as an execution start state, and a state group to be executed last when transitioning from the service context to another service context is acquired as an execution end state.

When the calculation target is "request device prior engagement service context", a state to be executed first when a transition from another service context to the service context is acquired as an execution start state, and a state group transitioning from the service context to another service context is acquired as an execution end state.

b) A probability of transition from one state to another state (hereinafter, it is referred to as a single state transition probability) is calculated using the state transition log information stored in the state transition information storage section 125. When there are "n" pieces of b_{1}, ..., b_{n} states that can transition from a state "a" of transition source, the single state transition probability from the state "a" to the state b_{i} is calculated by the following equation. p_{a→b_{i}}=(the number of transitions from state "a" to state b_{i})Σj=1 ... n (the number of transitions from state "a" to state b_{j})

c) Regarding each combination of the execution start state and the execution end state acquired in a), for each combination of state groups that transition between the execution start state and the execution end state, the single state transition probability calculated in b) is used for each combination of states before and after the transition, and then the probability of transitioning the entire state from the execution start state to the execution end state (hereinafter, it is referred to as an entire state transition probability) is calculated.

d) For the execution start state, the execution end state, and the state group transitioning between the execution start state and the execution end state having the highest entire state transition probability calculated in c), the length of time required for each state transition is calculated as an average of time required for the state transition stored in the state transition information storage section 125, and the length of time obtained by adding the calculated length of time required for the respective state transitions is set as a required execution time for "request device occupation service context" and "request device prior engagement service context".

3) The time, at which all of the "request device occupation service context" and "request device prior engagement service context" calculated by the processing of 2) ends, is calculated as an occupation start time of the service context.

Operation Sequence (1) Service Program Registration Sequence

Figure 15:
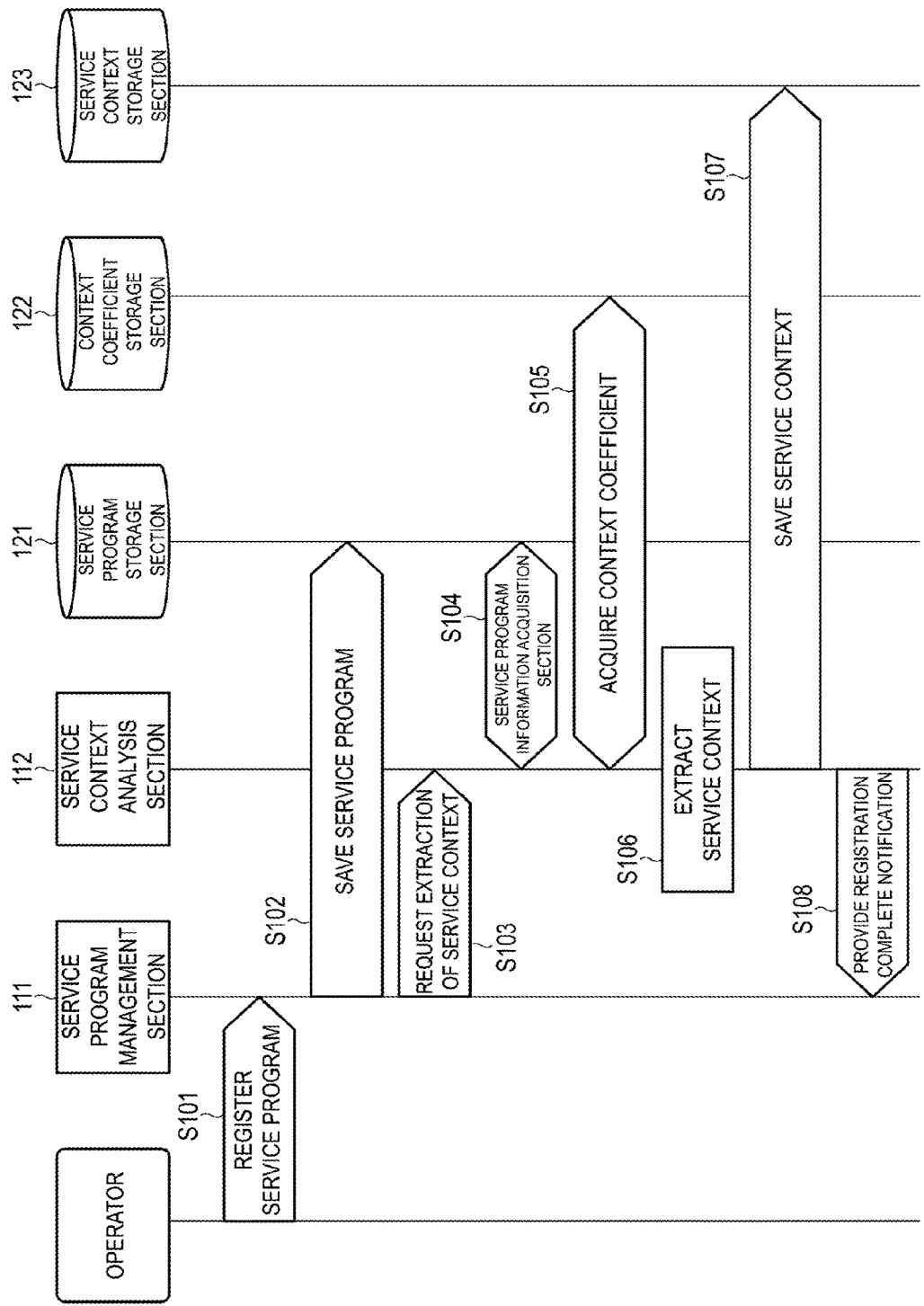
FIG. 15 is a sequence diagram illustrating an example of service program registration processing executed by the control unit illustrated in FIG. 4.

FIG. 15 is a sequence diagram illustrating an example of service program registration processing executed by the control unit 11 illustrated in FIG. 4.

In step S101, an operator inputs a service program to the input section 2, and the control unit 11 acquires the service program from the input section 2 and registers the acquired service program under the control of the registration management section 1111 of the service program management section 111.

In step S102, the control unit 11 causes the service program storage section 121 to store the acquired service program under the control of the registration management section 1111.

In step S103, the control unit 11 transmits a request for extracting a service context of the service program to the service context analysis section 112 under the control of the registration management section 1111.

In step S104, the control unit 11 reads and acquires the service program stored in the service program storage section 121 under the control of the service context analysis section 112.

In step S105, the control unit 11 reads and acquires context coefficients of events of reception of transmission data for each device and transmission of a control command for each device stored in the context coefficient storage section 122 under the control of the service context analysis section 112.

In step S106, the control unit 11 determines and extracts a service context relating to the service program based on the context coefficient acquired in step S105 under the control of the service context analysis section 112. In step S106, for example, processing similar to the service context determination processing described in detail above is executed.

In step S107, the control unit 11 causes the service context storage section 123 to store information about the determined service context under the control of the service context analysis section 112.

In step S108, the control unit 11 transmits a notification of completion of registration of the service program to the registration management section 1111 of the service program management section 111 under the control of the service context analysis section 112.

(2) Service Start Sequence

After the registration of the service program is completed, a service based on the service program can be started.

Figure 16:
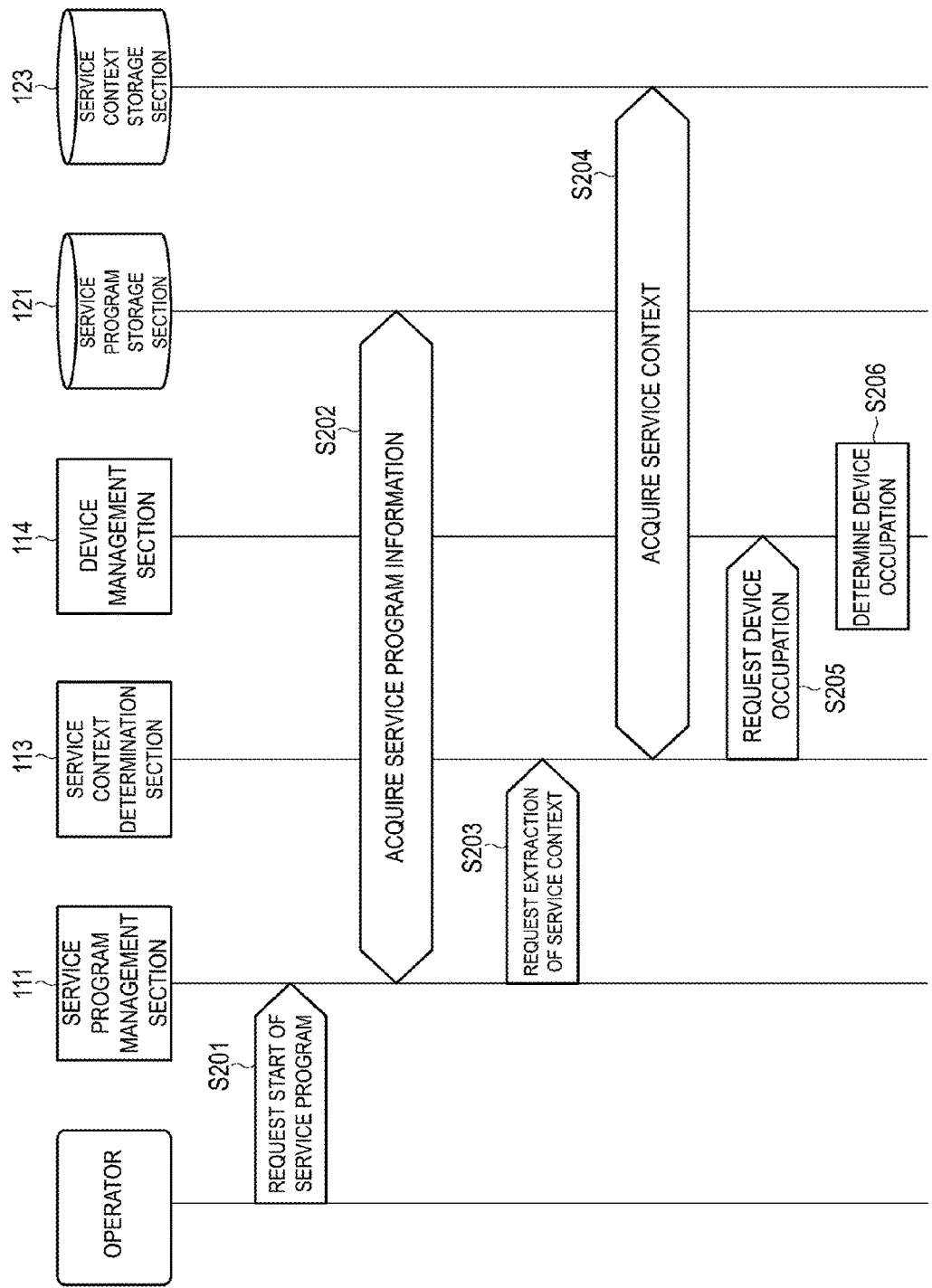
FIG. 16 is a sequence diagram illustrating an example of service start processing executed by the control unit illustrated in FIG. 4.

FIG. 16 is a sequence diagram illustrating an example of service start processing executed by the control unit 11 illustrated in FIG. 4.

In step S201, an operator inputs a start request for a registered service program via the input section 2, and the control unit 11 acquires the start request under the control of the execution management section 1112 of the service program management section 111.

In step S202, the control unit 11 reads and acquires the service program relating to the start request stored in the service program storage section 121 under the control of the execution management section 1112.

In step S203, the control unit 11 transmits a request for extracting the service context of the service program to the service context determination section 113 under the control of the execution management section 1112.

In step S204, the control unit 11 reads and acquires the service context information of the service program stored in the service context storage section 123 under the control of the service context determination section 113.

In step S205, the control unit 11 transmits a device occupation request for occupying a device group necessary for executing the service context of the service program by the service program to the device management section 114 under the control of the service context determination section 113.

In step S206, the control unit 11 determines whether the device can be occupied based on the device occupation request under the control of the device occupation control section 1141 of the device management section 114.

(3) Device Occupation Sequence

In step S206, when it is determined that the device can be occupied, the device occupation processing is executed.

Figure 17:
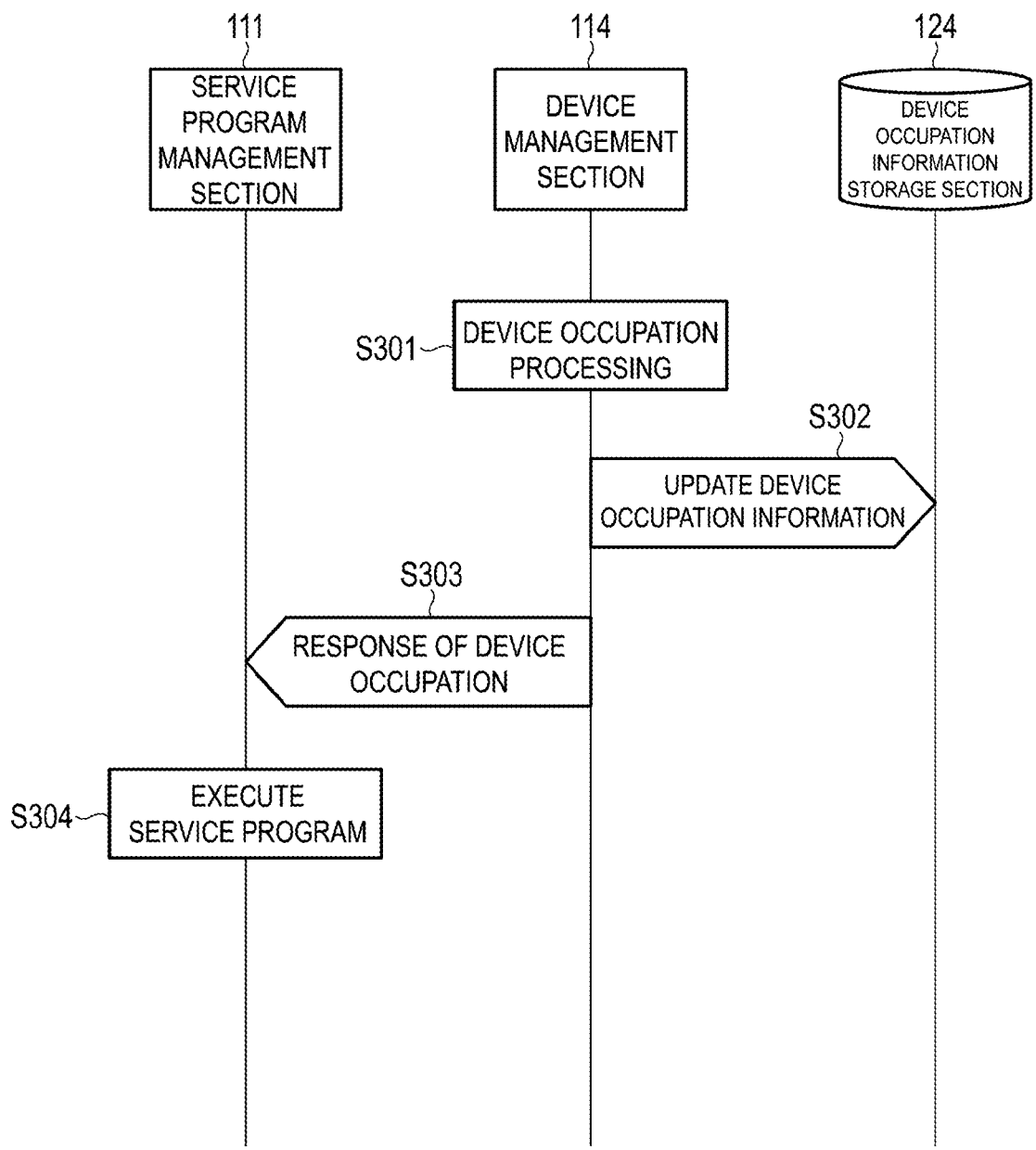
FIG. 17 is a sequence diagram illustrating an example of device occupation processing executed by the control unit illustrated in FIG. 4.

FIG. 17 is a sequence diagram illustrating an example of device occupation processing executed by the control unit 11 illustrated in FIG. 4.

In step S301, the control unit 11 executes the device occupation processing based on the device occupation request under the control of the device occupation control section 1141 of the device management section 114.

In step S302, the control unit 11 writes information about the device occupation status based on the device occupation processing in the device occupation information storage section 124 under the control of the device occupation control section 1141, and the device occupation information stored in the device occupation information storage section 124 is updated.

In step S303, the control unit 11 transmits a device occupation response to the execution management section 1112 of the service program management section 111 under the control of the device occupation control section 1141.

In step S304, the control unit 11 executes the service program under the control of the execution management section 1112.

On the other hand, in step S206, when it is determined that the device cannot be occupied, the device occupation reservation processing is executed first, and then the device occupation processing is executed.

Figure 18:
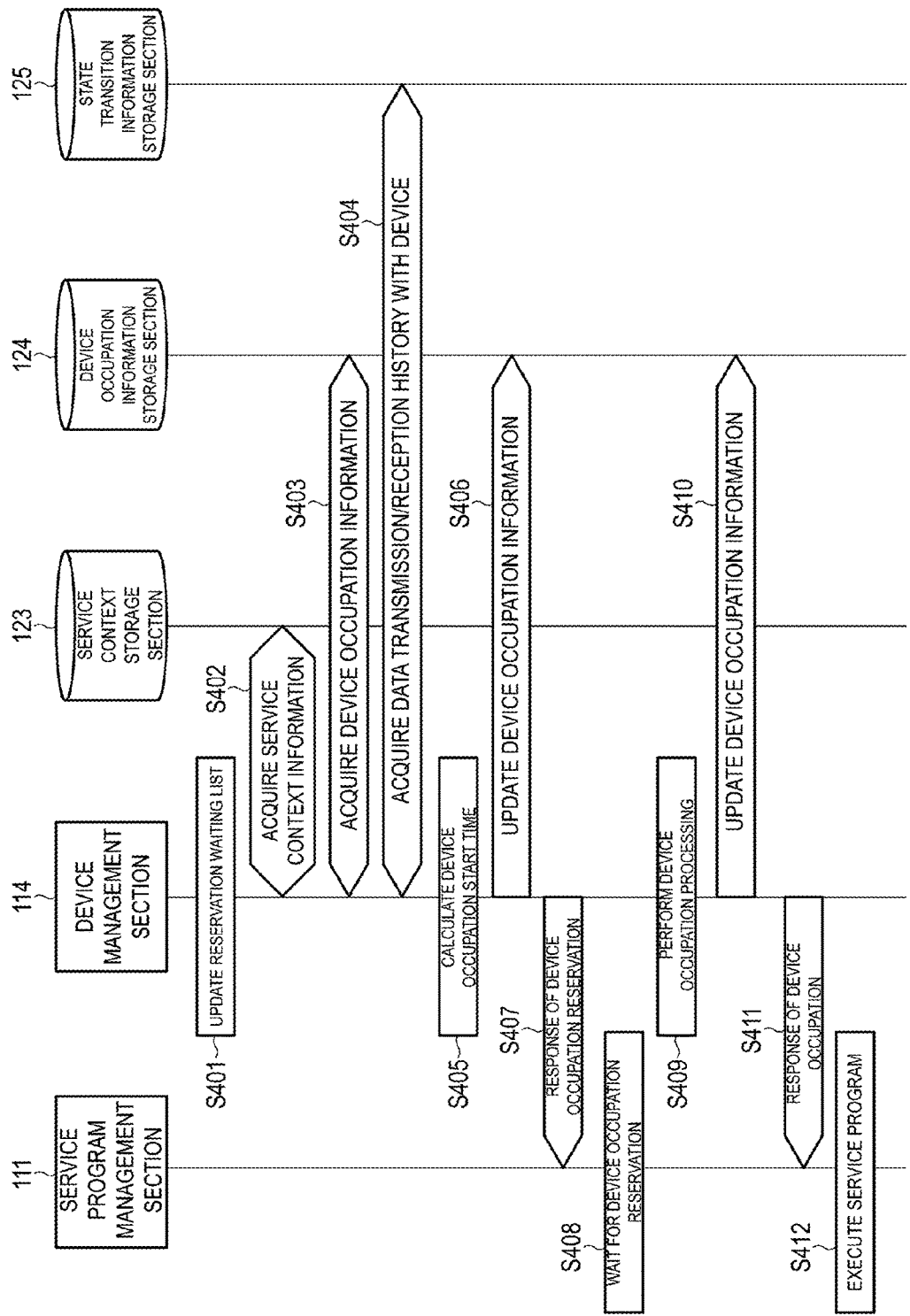
FIG. 18 is a sequence diagram illustrating an example of device occupation reservation processing and device occupation processing executed by the control unit illustrated in FIG. 4.

FIG. 18 is a sequence diagram illustrating an example of device occupation reservation processing and device occupation processing executed by the control unit 11 illustrated in FIG. 4. In steps S401 to S408, the device occupation reservation processing is executed, and then, in steps S409 to S412, the device occupation processing is executed.

In step S401, the control unit 11 updates the reservation waiting list under the control of the device occupation control section 1141 of the device management section 114.

In step S402, the control unit 11 reads and acquires the service context information stored in the service context storage section 123 under the control of the device occupation start time calculation section 1142 of the device management section 114.

In step S403, the control unit 11 reads and acquires the device occupation information stored in the device occupation information storage section 124 under the control of the device occupation start time calculation section 1142.

In step S404, the control unit 11 reads and acquires the data transmission/reception history with the device stored in the state transition information storage section 125 under the control of the device occupation start time calculation section 1142.

Note that the processing in steps S402, S403, and S404 may be executed in a different order than described above, or any of these may be executed in parallel.

In step S405, the control unit 11 calculates the device occupation start time based on the information acquired in steps S402, S403, and S404 under the control of the device occupation start time calculation section 1142. In step S405, for example, the same processing as the device occupation start time calculation processing described in detail above is executed.

In step S406, the control unit 11 writes information about a device occupation reservation status in the device occupation information storage section 124 under the control of the device occupation control section 1141 of the device management section 114, and the device occupation information stored in the device occupation information storage section 124 is updated.

In step S407, the control unit 11 transmits a device occupation reservation response to the execution management section 1112 of the service program management section 111 under the control of the device occupation control section 1141.

In step S408, the control unit 11 waits for occupation reservation of the device under the control of the execution management section 1112.

When the occupation of the device waiting for the reservation is released in step S408, the control unit 11 executes the device occupation processing under the control of the device occupation control section 1141 of the device management section 114 in step S409.

In step S410, the control unit 11 writes information about the device occupation status based on device occupation processing in the device occupation information storage section 124 under the control of the device occupation control section 1141, and the device occupation information stored in the device occupation information storage section 124 is updated.

In step S411, the control unit 11 transmits a device occupation response to the execution management section 1112 of the service program management section 111 under the control of the device occupation control section 1141.

In step S412, the control unit 11 executes the service program under the control of the execution management section 1112.

(4) Device Communication Sequence

When the service program is started, data communication with a device according to the contents of the service program is executed.

Figure 19:
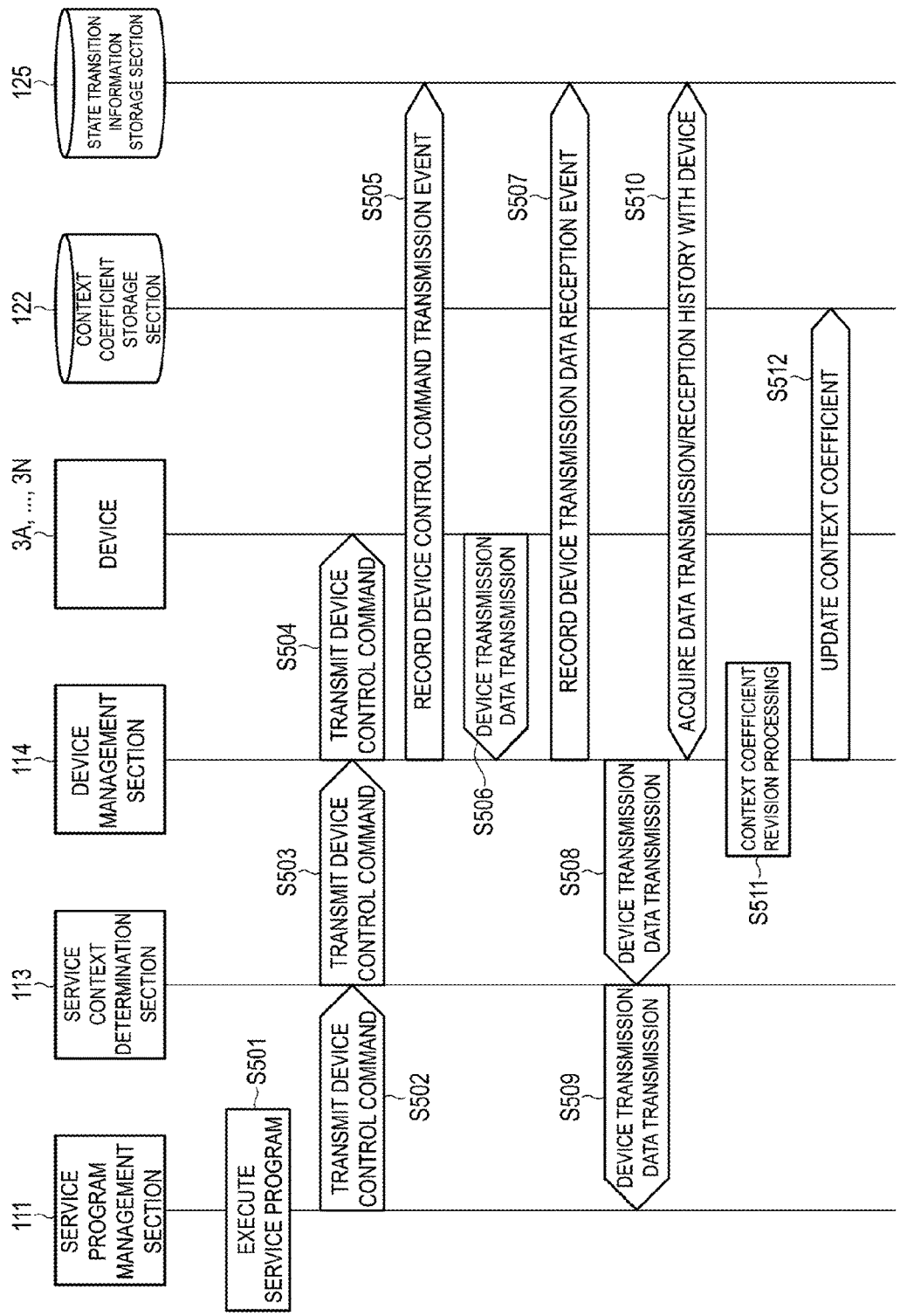
FIG. 19 is a sequence diagram illustrating an example of device communication processing executed by the control unit illustrated in FIG. 4.

FIG. 19 is a sequence diagram illustrating an example of device communication processing executed by the control unit 11 illustrated in FIG. 4.

In step S501, the control unit 11 executes a service program under the control of the execution management section 1112 of the service program management section 111.

In step S502, the control unit 11 transmits a device control command to the service context determination section 113 under the control of the execution management section 1112.

In step S503, the control unit 11 transmits a device control command to the device management section 114 under the control of the service context determination section 113.

In step S504, the control unit 11 transmits a device control command to a destination device among the devices 3A to 3N under the control of the device management section 114.

In step S505, the control unit 11 causes the state transition information storage section 125 to store information about the transmission event of the device control command under the control of the device management section 114.

In step S506, the device occupied by the service program among the devices 3A to 3N transmits data, and the control unit 11 acquires the device transmission data under the control of the device management section 114.

In step S507, the control unit 11 causes the state transition information storage section 125 to store information about the reception event of the device transmission data under the control of the device management section 114.

In step S508, the control unit 11 transmits the device transmission data to the service context determination section 113 under the control of the device management section 114.

In step S509, the control unit 11 transmits the device transmission data to the execution management section 1112 of the service program management section 111 under the control of the service context determination section 113.

The device control command transmission processing in steps S502 to S505 and the device transmission data reception processing in steps S506 to S509 are repeated.

The context coefficient revision processing can be executed using the information about the transmission event of the device control command stored in the state transition information storage section 125 in step S505 and the information about the reception event of the device transmission data stored in the state transition information storage section 125 in step S507.

In step S510, the control unit 11 reads and acquires history information of a transmission event of the device control command and a reception event of the device transmission data stored in the state transition information storage section 125 under the control of the context coefficient revising section 1143 of the device management section 114.

In step S511, the control unit 11 executes the context coefficient revision processing based on the history information of the transmission event of the device control command and the reception event of the device transmission data acquired in step S510 under the control of the context coefficient revising section 1143. In step S511, for example, processing similar to the context coefficient revision processing described in detail above is executed.

In step S512, the control unit 11 writes the revised context coefficient value into the context coefficient storage section 122 under the control of the context coefficient revising section 1143, and the context coefficient stored in the context coefficient storage section 122 is updated.

Note that the processing in steps S510 to S512 is not limited to being executed at the above-described timing, and may be executed at any timing.

(5) Service Context Switching Sequence

A service program is started, and a service context relating to the service program is switched during the execution of data communication with a device according to the content of the service program.

Figure 20:
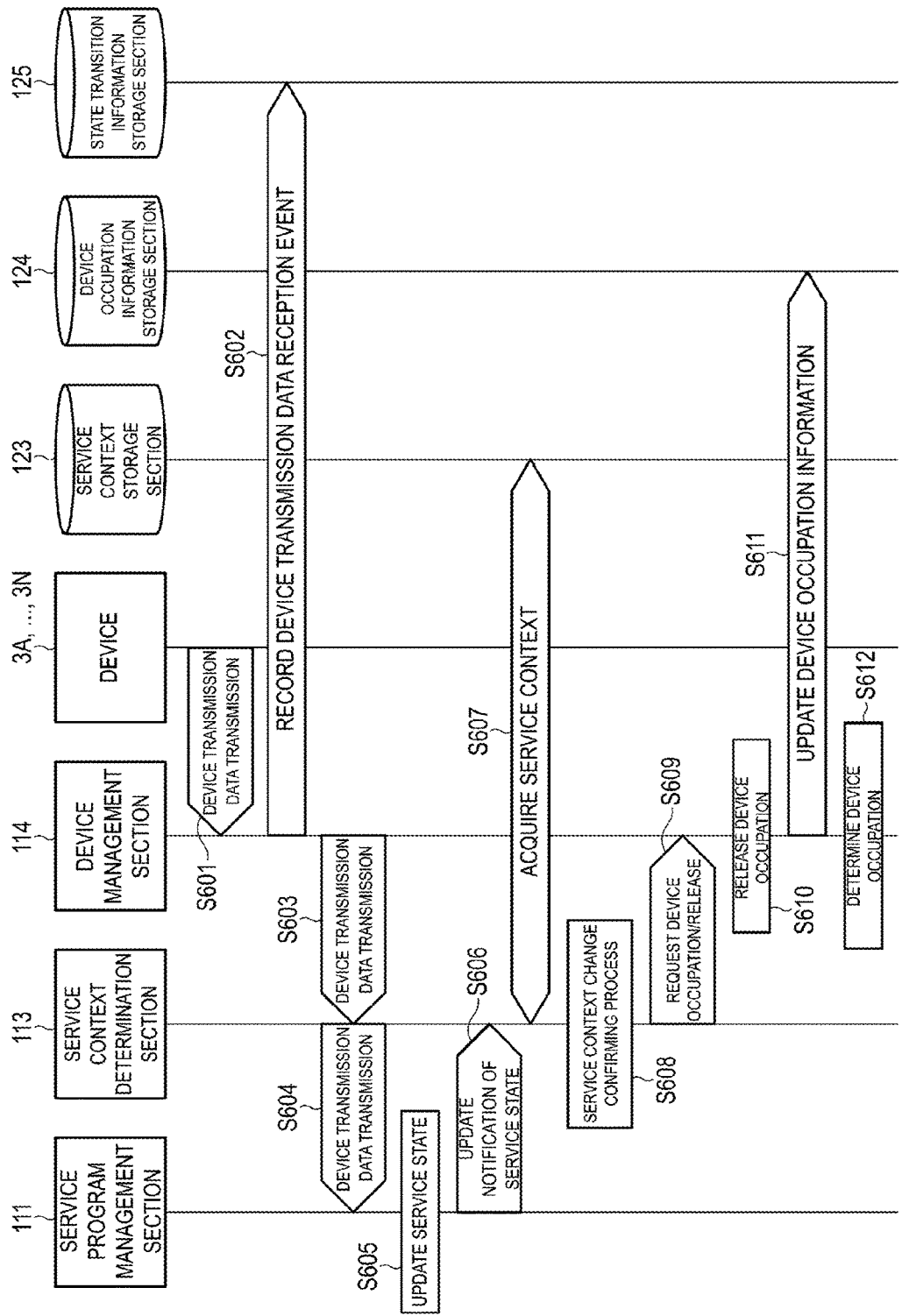
FIG. 20 is a sequence diagram illustrating an example of service context switch processing executed by the control unit illustrated in FIG. 4.

FIG. 20 is a sequence diagram illustrating an example of service context switch processing executed by the control unit 11 illustrated in FIG. 4.

In step S601, the device occupied by the service program among the devices 3A to 3N transmits data, and the control unit 11 acquires the device transmission data under the control of the device management section 114.

In step S602, the control unit 11 causes the state transition information storage section 125 to store information about the reception event of the device transmission data under the control of the device management section 114.

In step S603, the control unit 11 transmits the device transmission data to the service context determination section 113 under the control of the device management section 114.

In step S604, the control unit 11 transmits the device transmission data to the execution management section 1112 of the service program management section 111 under the control of the service context determination section 113.

In step S605, the control unit 11 updates a service state of the service program when the device transmission data satisfies a predetermined transition condition of state transition under the control of the execution management section 1112.

In step S606, the control unit 11 transmits a notification of the update of the service state to the service context determination section 113 under the control of the execution management section 1112.

In step S607, the control unit 11 reads and acquires the service context information of the service program stored in the service context storage section 123 under the control of the service context determination section 113.

In step S608, the control unit 11 executes the processing of confirming whether there is a change in the service context to be executed by the service program based on the service context information acquired in step S607 under the control of the service context determination section 113.

When it is confirmed that the service context is changed in step S608, the control unit 11 transmits a device occupation request or a device occupation release request to the device management section 114 in step S609 under the control of the service context determination section 113.

In step S610, the control unit 11 executes the device occupation release processing under the control of the device occupation control section 1141 of the device management section 114.

In step S611, the control unit 11 writes information about the device occupation status based on the device occupation release processing in the device occupation information storage section 124 under the control of the device occupation control section 1141, and the device occupation information stored in the device occupation information storage section 124 is updated.

In step S612, the control unit 11 determines whether the device can be occupied based on the device occupation request under the control of the device occupation control section 1141.

In step S612, when it is determined that the device can be occupied, the processing in steps S301 to S304 is executed. On the other hand, in step S612, when it is determined that the device cannot be occupied, the processing in steps S401 to S412 is executed.

(6) Service Stop Sequence

A service program is started, and the service stop processing can be executed during the execution of data communication with the device according to the content of the service program.

Figure 21:
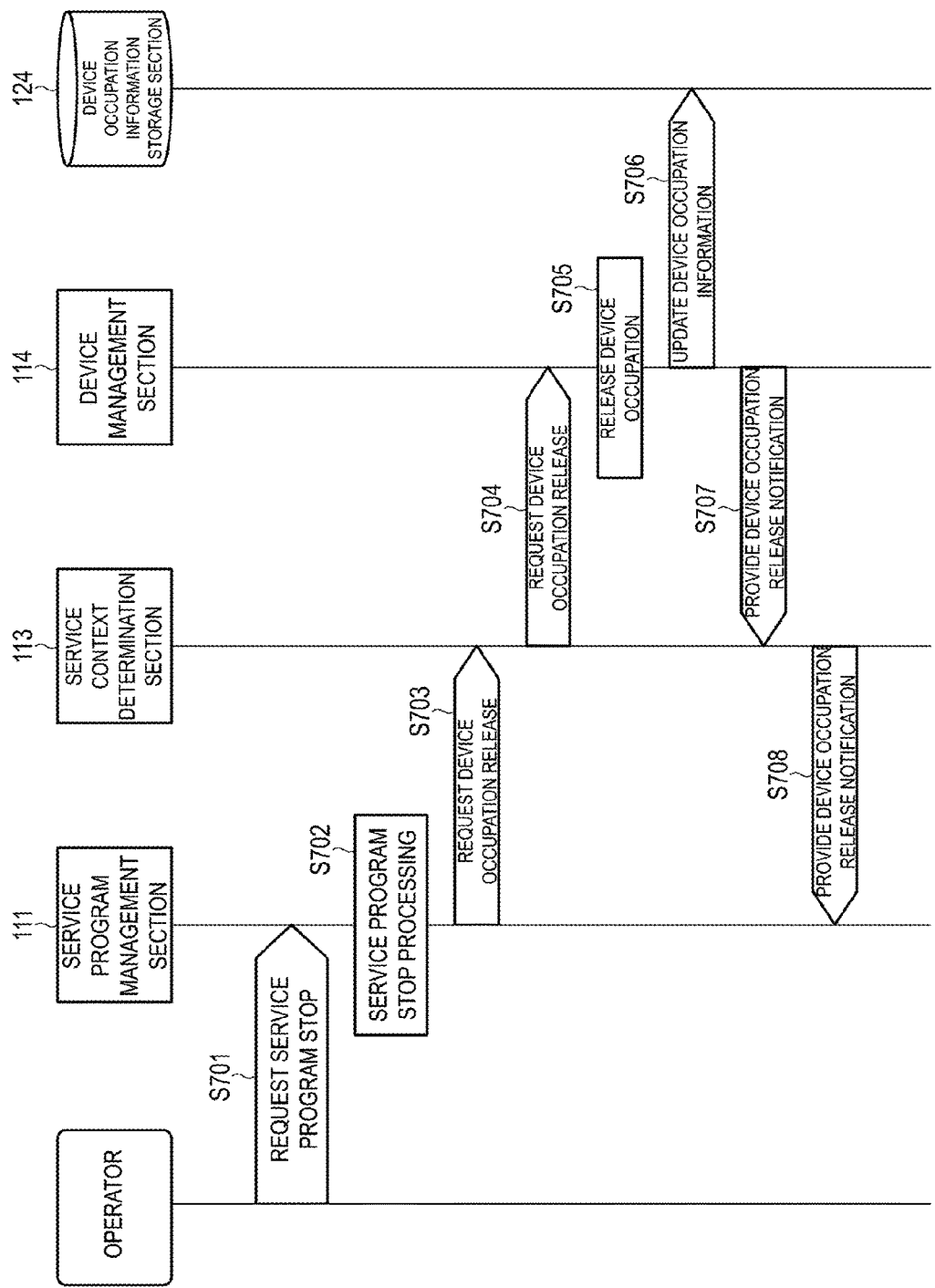
FIG. 21 is a sequence diagram illustrating an example of service stop processing executed by the control unit illustrated in FIG. 4.

FIG. 21 is a sequence diagram illustrating an example of service stop processing executed by the control unit 11 illustrated in FIG. 4.

In step S701, an operator inputs a stop request of the service program being executed via the input section 2, and the control unit 11 acquires the stop request under the control of the execution management section 1112 of the service program management section 111.

In step S702, the control unit 11 executes the service program stop processing under the control of the execution management section 1112.

In step S703, the control unit 11 transmits a device occupation release request for releasing the occupation of the device by the service program to the service context determination section 113 under the control of the execution management section 1112.

In step S704, the control unit 11 transmits the device occupation release request to the device management section 114 under the control of the service context determination section 113.

In step S705, the control unit 11 executes the device occupation release processing based on the device occupation release request under the control of the device occupation control section 1141 of the device management section 114.

In step S706, the control unit 11 writes information about the device occupation status based on the device occupation release processing in the device occupation information storage section 124 under the control of the device occupation control section 1141, and the device occupation information stored in the device occupation information storage section 124 is updated.

In step S707, the control unit 11 transmits a notification of the release of the device occupation to the service context determination section 113 under the control of the device management section 114.

In step S708, the control unit 11 transmits a notification of the release of the device occupation to the execution management section 1112 of the service program management section 111 under the control of the service context determination section 113.

Effect (1) A request for extracting a service context of a service program is transmitted to the service context analysis section 112 under the control of the registration management section 1111 of the service program management section 111. Context coefficients of events of reception of transmission data for each device and transmission of a control command for each device are acquired under the control of the service context analysis section 112. A service context relating to the service program is determined and extracted based on the acquired context coefficient under the control of the service context analysis section 112.

Thereby, control of device allocation to a service program can be executed as follows with an optimum granularity of the service context determined based on the context coefficient.

(2) Device transmission data is transmitted to an execution management section 1112 of the service program management section 111 under the control of the service context determination section 113. When the device transmission data is device transmission data that satisfies a predetermined transition condition of a state transition, a service state of the service program is updated under the control of an execution management section 1112. After that, under the control of the execution management section 1112, a notification of update of the service state is transmitted to a service context determination section 113. Under the control of the service context determination section 113, the service context information relating to the service program is acquired, and based on the acquired service context information, whether there is a change in the service context to be executed by the service program is confirmed. When it is confirmed that the service context is changed, a device occupation request or a device occupation release request is transmitted to a device management section 114 under the control of the service context determination section 113.

As a result of performing such control, even when the device is required to execute the service program during the execution of the service program, there is a device that is not allocated to the service program. Thus, even in a case of interruption by another service program, such a device can be allocated to the service program without interrupting the service program being executed, and the device can be shared by a plurality of services. On the other hand, control is performed such that the required device is allocated to the service program in the unit of service context so that the device can be prevented from being used by another service while the service program requires the device.

(3) History information about a transmission event of the device control command and a reception event of the device transmission data is acquired under the control of the context coefficient revising section 1143 of the device management section 114. The context coefficient revision processing is executed based on the history information about the acquired transmission event of the device control command and the reception event of the device transmission data under the control of the context coefficient revising section 1143.

As described above, for example, the communication status and the like at the time by execution of the service program can be reflected in the context coefficient so that it is possible to make the service context determined based on the context coefficient a more realistic granularity.

(4) Whether a device can be occupied is determined based on a device occupation request under the control of the device occupation control section 1141 of the device management section 114. When it is determined that the device cannot be occupied, a reservation waiting list is updated under the control of the device occupation control section 1141 of the device management section 114. After that, service context information, device occupation information, and a data transmission/reception history with the device are acquired, and device occupation start time is calculated based on the service context information, the device occupation information, and the data transmission/reception history with the device under the control of the device occupation start time calculation section 1142 of the device management section 114.

The predicted device occupation start time calculated based on real data from the past in this way is high reliability, and by using the device occupation start time calculated in this way, the time management of a device shared among a plurality of services is facilitated.

Other Embodiments

Note that the present disclosure is not limited to the first embodiment.

For example, the configuration of the device management system or the structure of data stored in each of the context coefficient storage section, the service context storage section, the device occupation information storage section, and the state transition information storage section or the like can be variously modified and implemented without departing from the gist of the present disclosure.

In short, the present disclosure is not limited to the above-described first embodiment as it is, and can be embodied by modifying its constituent elements in an implementation stage without departing from the scope of the disclosure. Various disclosures can be formed by appropriately combining a plurality of components disclosed in the first embodiment. For example, some components may be deleted from all the components illustrated in the first embodiment. Further, components of different embodiments may be appropriately combined.

REFERENCE SIGNS LIST

AC1, AC2, AC3, BC1, BC2, BC3, BC4 Service context
A1, A2, A3, A4, A5, A6, A7, A8, A9, A10, B1, B2, B3, B4, B5, B6, B7, B8, B9, B10, B11 State
1 Device management system
11 Control unit
111 Service program management section
1111 Registration management section
1112 Execution management section
112 Service context analysis section
113 Service context determination section
114 Device management section
1141 Device occupation control section
1142 Device occupation start time calculation section
1143 Context coefficient revising section
12 Storage unit
121 Service program storage section
122 Context coefficient storage section
123 Service context storage section
124 Device occupation information storage section
125 State transition information storage section
13 Communication interface unit
2 Input section
3A, 3B, 3C, 3N Device
NW Communication network

The invention claimed is:
1. A device allocation control method, executed by an apparatus including a hardware processor and a memory, for allocating a device on a service providing field to a service program stored in a storage section, the device allocation control method comprising:
receiving, via a communication interface of the apparatus, the service program;
extracting a set of states and a set of state transitions from the service program;
transmitting a device control command to a device allocated to the service program and receiving a data communication from the device allocated to the service program;
recording a data transmission history between the apparatus and the device allocated to the service program;
extracting, from the data transmission history, a respective data communication event for each of the states and each of the state transitions of the service program;
for each respective data communication event, determining (i) a respective service context of and (ii) a respective context coefficient corresponding to a respective score value representing a likelihood of occurrence of another data communication event subsequent to the respective communication event
a service context determination step of determining, during an execution of the service program by the apparatus, whether to start or end a first service context of the service program based on data communicated between the device allocated to the service program and the apparatus; and during the execution of the service program by the apparatus, a device occupation control step including at least one of the steps of:

allocating, in case the first service context is determined to start, a device to be used for executing the first service context determined to start to the service program, and releasing, in case the first service context is determined to end, an allocation of the device to be used for executing the first service context determined to end to the service program.

2. The device allocation control method according to claim 1, further comprising:

revising the context coefficient based on a history of a data communication event having occurred between the device allocated to the service program and the apparatus.

3. The device allocation control method according to claim 1, wherein:

the device occupation control step further includes, in case the first service context is determined to start and the device to be used for executing the first service context is allocated to a second service program, providing a notification indicating a time at which the device becomes available to be allocated to the service program.

4. The device allocation control method according to claim 3, wherein:

the device occupation control step includes, in case the first service context is determined to start and the device to be used for executing the first service context is allocated to the second service program, calculating the time at which the device becomes available to be allocated to the service program based on a history of a maintenance time of each state included in the second service program during an execution of the second service program, and a history of a state transition indicating a state preceding and subsequent to a transition of the state transition in the second service program during the execution of the second service program.

5. A device allocation control system for allocating a device on a service providing field to a service program stored in a storage section, the device allocation control system comprising:

a service context determination section, including one or more processors, configured to receive, via a communication interface of an apparatus, the service program, extract a set of states and a set of state transitions from the service program, transmit a device control command to a device allocated to the service program and receive a data communication from the device allocated to the service program, record a data transmission history between the apparatus and the device allocated to the service program, extract, from the data transmission history, a respective data communication event for each of the states and each of the state transitions of the service program; for each respective data communication event, determining (i) a respective service context of and (ii) a respective context coefficient corresponding to a respective score value representing a likelihood of occurrence of another data communication event subsequent to the respective communication event, and determine, during an execution of the service program by the system, whether to start or end a first service context of the service program based on data communicated between the device allocated to the service program and the system; and a device occupation control section including a control section, including one or more processors, configured to, during the execution of the service program by the system, at least one of:

allocate, in case the first service context is determined to start, a device to be used for executing the first service context determined to start to the service program, and release, in case the first service context is determined to end, an allocation of the device to be used for executing the first service context determined to end to the service program.

6. The device allocation control system according to claim 5, further comprising:

a context coefficient revising section, including one or more processors, configured to revise the context coefficient based on a history of a data communication event having occurred between the device allocated to the service program and the apparatus.

7. The device allocation control system according to claim 5, wherein the control section is further configured to, in case the first service context is determined to start and the device to be used for executing the first service context is allocated to a second service program, provide a notification indicating a time at which the device becomes available to be allocated to the service program.

8. The device allocation control system according to claim 7, wherein the control section is further configured to, in case the first service context is determined to start and the device to be used for executing the first service context is allocated to the second service program, calculate the time at which the device becomes available to be allocated to the service program based on a history of a maintenance time of each state included in the second service program during an execution of the second service program, and a history of a state transition indicating a state preceding and subsequent to a transition of the state transition in the second service program during the execution of the second service program.

9. A non-transitory computer readable medium storing instructions that when executed by a computer cause the computer to perform a device allocation control method comprising:

receiving, via a communication interface of an apparatus, a service program;

extracting a set of states and a set of state transitions from the service program;

transmitting a device control command to a device allocated to the service program and receiving a data communication from the device allocated to the service program;

recording a data transmission history of the device allocated to the service program;

extracting, from the data transmission history, a respective data communication event for each of the states and each of the state transitions of the service program;

for each respective data communication event, determining (i) a respective service context of and (ii) a respective context coefficient corresponding to a respective score value representing a likelihood of occurrence of another data communication event subsequent to the respective communication event;

a service context determination step of determining, during an execution of the service program by the apparatus, whether to start or end a first service context of the service program based on data communicated between the device allocated to the service program and the apparatus; and during the execution of the service program by the apparatus, a device occupation control step including at least one of the steps of:

allocating, in case the first service context is determined to start, a device to be used for executing the first service context determined to start to the service program, and releasing, in case the first service context is determined to end, an allocation of the device to be used for executing the first service context determined to end to the service program.

10. The non-transitory computer readable medium according to claim 9, wherein the device allocation control method further comprises:

revising the context coefficient based on a history of a data communication event having occurred between the device allocated to the service program and the apparatus.

11. The non-transitory computer readable medium according to claim 9, wherein:

the device occupation control step further includes, in case the first service context is determined to start and the device to be used for executing the first service context is allocated to a second service program, providing a notification indicating a time at which the device becomes available to be allocated to the service program.

12. The non-transitory computer readable medium according to claim 11, wherein:

the device occupation control step includes, in case the first service context is determined to start and the device to be used for executing the first service context is allocated to the second service program, calculating the time at which the device becomes available to be allocated to the service program based on a history of a maintenance time of each state included in the second service program during an execution of the second service program, and a history of a state transition indicating a state preceding and subsequent to a transition of the state transition in the second service program during the execution of the second service program.

* * * * *